United States Patent
Char et al.

(10) Patent No.: US 10,533,069 B2
(45) Date of Patent: Jan. 14, 2020

(54) CYCLIC POLYSULFANE-BASED POLYMER, METHOD FOR PREPARING SAME, AND FILM COMPRISING SAME

(71) Applicant: SEOUL NATIONAL UNIVERSITY R&DB FOUNDATION, Seoul (KR)

(72) Inventors: Kookheon Char, Seoul (KR); Jeewoo Lim, Seoul (KR); Tae-Lim Choi, Seoul (KR); Yunshik Cho, Daejeon (KR); Eun-Hye Kang, Yongin-si (KR); Sanghee Yang, Goyang-si (KR)

(73) Assignee: SEOUL NATIONAL UNIVERSITY R$DB FOUDATION, Seoul (KR)

( * ) Notice: Subject to any disclaimer, the term of this patent is extended or adjusted under 35 U.S.C. 154(b) by 0 days.

(21) Appl. No.: 15/749,157

(22) PCT Filed: Jul. 29, 2016

(86) PCT No.: PCT/KR2016/008397
§ 371 (c)(1),
(2) Date: Jan. 31, 2018

(87) PCT Pub. No.: WO2017/023045
PCT Pub. Date: Feb. 9, 2017

(65) Prior Publication Data
US 2018/0223034 A1   Aug. 9, 2018

(30) Foreign Application Priority Data
Jul. 31, 2015  (KR) .................. 10-2015-0109120

(51) Int. Cl.
*C08G 61/08* (2006.01)
*C08F 132/00* (2006.01)
*C08J 5/18* (2006.01)
*C08G 75/14* (2006.01)
(Continued)

(52) U.S. Cl.
CPC ............ *C08G 61/08* (2013.01); *C08F 4/7006* (2013.01); *C08F 32/08* (2013.01); *C08F 132/00* (2013.01);
(Continued)

(58) Field of Classification Search
CPC .. C08G 61/08; C08G 75/14; C08G 2261/126; C08G 2261/418; C08F 32/08
(Continued)

(56) References Cited

U.S. PATENT DOCUMENTS

2009/0069503 A1* 3/2009 Okada .................. C07D 339/00
525/327.2

FOREIGN PATENT DOCUMENTS

EP         1320566 B1    12/2005
JP         49114696 A    11/1974
(Continued)

OTHER PUBLICATIONS

Rys, et al, "A powerful method to prepare sulfur-rich macrocycles," Tetrahedron Letters 49 (2008) 6670-6673. (Year: 2008).*
(Continued)

*Primary Examiner* — Fred M Teskin
(74) *Attorney, Agent, or Firm* — Hamre, Schumann, Mueller & Larson, P.C.

(57) ABSTRACT

The present disclosure relates to a cyclic polysulfane-based polymer, a cyclic polysulfane-polynorbornene block copolymer, a method of preparing the cyclic polysulfane-based polymer, a method of preparing the cyclic polysulfane-polynorbornene block copolymer, and a film including the cyclic polysulfane-polynorbornene block copolymer.

17 Claims, 13 Drawing Sheets

(51) Int. Cl.
*C08F 4/70* (2006.01)
*C08F 32/08* (2006.01)
*C08G 61/12* (2006.01)

(52) U.S. Cl.
CPC ............ *C08G 61/12* (2013.01); *C08G 75/14* (2013.01); *C08J 5/18* (2013.01); *C08G 2261/3324* (2013.01); *C08G 2261/418* (2013.01); *C08J 2381/04* (2013.01)

(58) Field of Classification Search
USPC ..................................... 526/256; 525/284
See application file for complete search history.

(56) References Cited

FOREIGN PATENT DOCUMENTS

| KR | 1020000022993 A | 4/2000 |
|---|---|---|
| KR | 1020130075355 A | 7/2013 |

OTHER PUBLICATIONS

Okuma, et al, "Synthesis and reaction of tricyclic tetrathiins and pentathiepins: novel fomration of alpha-disulfines," Tetrahedron 68 (2012) 6211-6217. (Year: 2012).*

International Search Report of PCT/KR2016/008397 dated Oct. 25, 2016, 3 pages.

Leste-Lasserre et al., "Sulfur allotrope chemistry-S10 an effective two-sulfur transfer reagent", Tetrahedron Letters, Aug. 1999, vol. 40, No. 45, pp. 7961-7964.

Feher et al., "Contribution to the chemistry of sulfur, No. 104 Synthesis of pentathiepin and benzopentathiepin", Tetrahedron Letters, Mar. 1971, vol. 12, No. 24, pp. 2125-2126.

Sutthasupa et al., "Recent advances in ring-opening metathesis polymerization, and application to synthesis of functional materials", Polymer Journal, Oct. 13, 2010, vol. 42, No. 12, pp. 905-915.

Rickborn, "The Retro-diels-alder Reaction Part II. Dienophiles with one or more Heteroatom", Organic Reactions, 1998 vol. 53, pp. 223-642.

Chang et al., "Functional Polyolefins Containing Disulfide and Phosphoester Groups: Synthesis and Orthogonal Degradation", Macromolecules, Feb. 2014, vol. 47, pp. 1344-1350.

Contreras et al., "Synthesis and Gas Transport Properties of New High Glass Transition Temperature Ring-Opened Polynorbornenes", Macromolecules, May 9, 2002, vol. 35, pp. 4677-4684.

Lim, Jeewoo et al., "A one-pot synthesis of polysulfane-bearing block copolymer nanoparticles with tunable size and refractive index", Chemical Communications, 2016, vol. 52, pp. 2485-2488, Nov. 23, 2015.

* cited by examiner

CYCLIC POLYSULFANE-BASED POLYMER, METHOD FOR PREPARING SAME, AND FILM COMPRISING SAME

TECHNICAL FIELD

The present disclosure relates to a cyclic polysulfane-based polymer, a cyclic polysulfane-polynorbornene block copolymer, a method of preparing the cyclic polysulfane-based polymer, a method of preparing the cyclic polysulfane-polynorbornene block copolymer, and a film including the cyclic polysulfane-polynorbornene block copolymer.

BACKGROUND

In general, sulfur-containing functional groups (sulfide, polysulfide, sulfone, sulfoxide, and the like) possess high molar refraction, and this is exhibited as an improved refractive index of a sulfur-containing polymer as compared to a polymer which does not contain sulfur. It is generally known that as sulfur content increases, a refractive index of a polymer increases, but a material with high sulfur content exhibits a low solubility in an organic solvent and thus it is difficult to be processed. Further, sulfur poisoning referring to inactivation of a metal catalyst caused by a sulfur-containing material in a process using the metal catalyst has been known, and, thus, it is very restricted to select a polymer polymerization catalyst that makes a minimum side reaction with a sulfur-containing compound.

Organic polysulfanes, covalent compounds with the general structure of R—$S_n$—R (n=1, 2, 3. . . ), are among the organic materials with the highest sulfur contents due to the presence of consecutive S—S bonds. These compounds are known for their involvement in various important chemical conversions and their interesting biological characteristics including antibacterial and cytotoxic activities.

Polymers containing linear polysulfanes in the main chain have been used as macro chain transfer agents in radical polymerization, stabilizing agents against PMMA, and are also regarded as promising materials for applications in dynamic covalent bond chemistry. Moreover, with the recent concerns regarding a rising global excess sulfur production and the emergence of the direct utilization of elemental sulfur in preparation of advanced materials as an active area of research, polysulfanes (some of which are obtained directly from reactions of elemental sulfur) are of interest from both environmental and economic perspectives.

Despite numerous studies on the synthesis and properties of polysulfane-containing polymers, applications have been very limited. High sulfur-content polymers are insoluble and lack processability, and their soluble, lower sulfur-content counterparts show that they are unstable towards nucleophiles, notably phosphines, even at room temperature. Furthermore, the S—S bond dissociation energy decreases with the increasing number of sulfur atoms in a polysulfane, making polysulfane-containing polymers prone to thermal degradation at a relatively low temperature. Particularly, controlling high molar refractive indices thereof and a modified polymerization method for preparing polymers containing polysulfane moieties are demanded, but the low bond dissociation energy is a problem to a radical polymerization method.

Further, the instability of polysulfane against phosphine requires a polymerization catalyst which does not contain phosphine. Therefore, a preparation method for modifying polysulfane-containing polymers into processable forms is a very challenging problem from both perspectives of solubility and stability of a product.

In this regard, Korean Patent Laid-open Publication No. 2000-0022993 discloses a sulfur-containing (thio)ether (co)polymer, and an optical element and a plastic lens manufactured using the same.

DISCLOSURE OF THE INVENTION

Problems to be Solved by the Invention

The present disclosure relates to a cyclic polysulfane polymer, a cyclic polysulfane-polynorbornene block copolymer, a method of preparing the cyclic polysulfane polymer, a method of preparing the cyclic polysulfane-polynorbornene block copolymer, and a film including the cyclic polysulfane-polynorbornene block copolymer.

However, problems to be solved by the present disclosure are not limited to the above-described problems. Although not described herein, other problems to be solved by the present disclosure can be clearly understood by a person with ordinary skill in the art from the following description.

Means for Solving the Problems

A first aspect of the present disclosure provides a cyclic polysulfane-based polymer which is obtained by polymerization of a sulfur-containing cyclic olefin monomer.

A second aspect of the present disclosure provides a cyclic polysulfane-polynorbornene block copolymer which is obtained by copolymerizing a sulfur-containing cyclic olefin monomer with a soluble norbornene-based monomer.

A third aspect of the present disclosure provides a film including the cyclic polysulfane-polynorbornene block copolymer according to the first aspect of the present disclosure or the second aspect of the present isclosure.

A fourth aspect of the present disclosure provides a method of preparing the cyclic polysulfane-based polymer according to the first aspect of the present disclosure, including: one-pot polymerizing a sulfur-containing cyclic olefin monomer in the presence of a phosphine-free third generation Grubbs catalyst to obtain the cyclic polysulfane-based polymer.

A fifth aspect of the present disclosure provides a method of preparing the cyclic polysulfane-polynorbornene block copolymer according to the second aspect of the present disclosure, including: polymerizing a soluble norbornene-based monomer in the presence of a phosphine-free third-generation Grubbs catalyst, followed by copolymerization with a sulfur-containing cyclic olefin monomer to form a cyclic polysulfane-polynorbornene block copolymer.

Effects of the Invention

According to an exemplary embodiment of the present disclosure, the obtained cyclic polysulfane-based polymer can be processed to be dissolved or dispersed in an organic solvent and thus can be applied in various forms.

According to an exemplary embodiment of the present disclosure, it is possible to synthesize a polymer or nanoparticles of the polymer which has excellent processability and can be controlled in sulfur content depending on a feed ratio of a monomer by polymerizing a cyclic olefin monomer including a hetero ring with high sulfur content alone or copolymerizing the cyclic olefin monomer with another cyclic olefin monomer through ring-opening metathesis copolymerization. Further, since the size of the nanoparticles are directly proportional to the overall degree of polymerization, it is possible to control the size of the nanoparticles of the polymer by controlling the sulfur content.

In an exemplary embodiment of the present disclosure, the sulfur content of nanoparticles of the polysulfane-based polymer or polysulfane-polynorbornene block copolymer can be controlled by varying a feed ratio of the sulfur-containing cyclic olefin monomer. Further, the refractive index of the block copolymer prepared in a controlled manner can be controlled in the range of from 1.5 to 1.8 by controlling the sulfur content of the polymer nanoparticles.

BEST MODE FOR CARRYING OUT THE INVENTION

Figure 1:
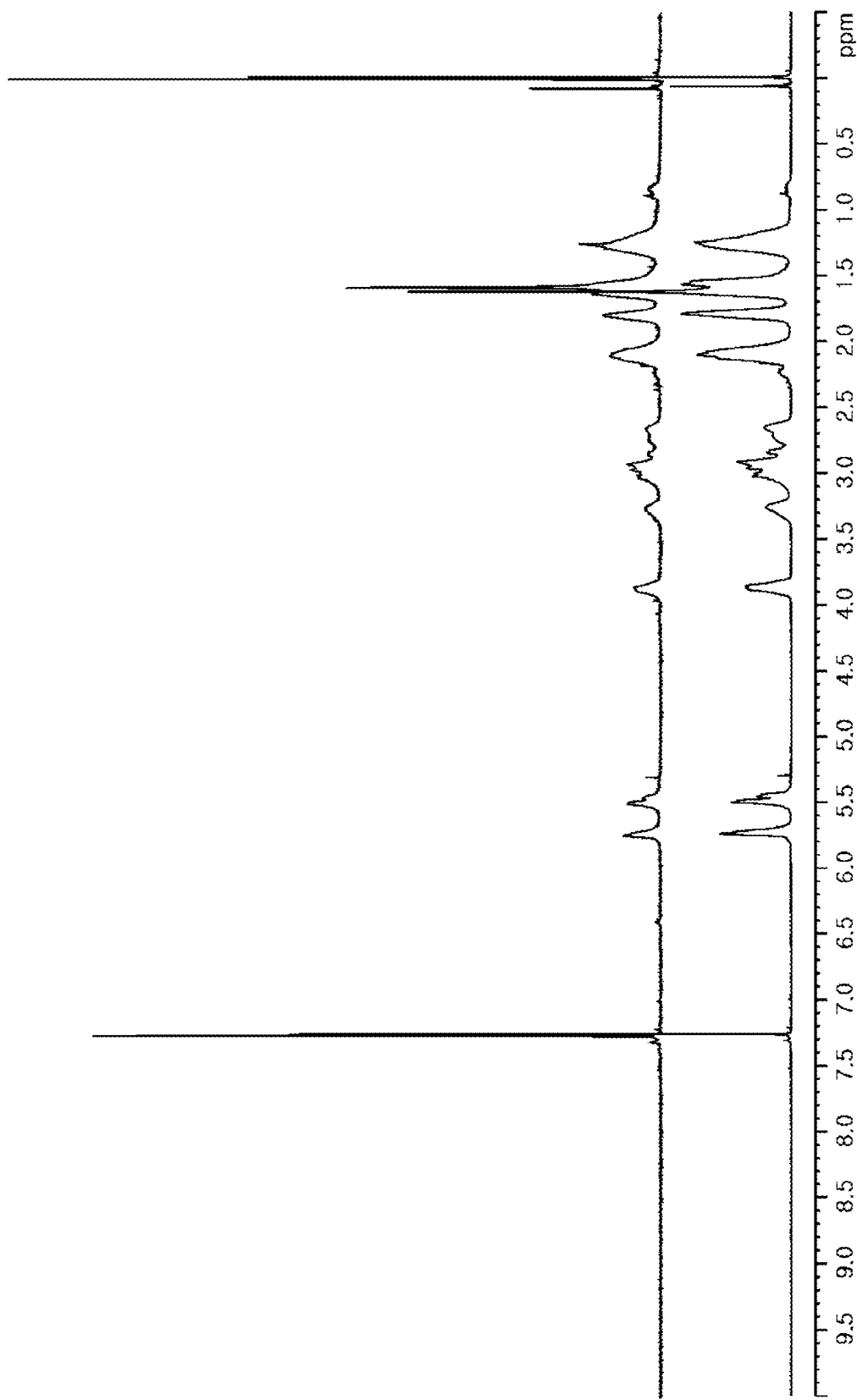
FIG. 1 shows $^1$H NMR spectra of synthesized cyclic polysulfane-polynorbornene block copolymer in accordance with an example of the present disclosure.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "alkyl group" typically refers to linear or branched alkyl groups having 1 to 25 carbon atoms, 1 to 20 carbon atoms, 1 to 10 carbon atoms, 1 to 8 carbon atoms, 1 to 5 carbon atoms, or 1 to 3 carbon atoms. If the alkyl group is substituted with an alkyl group, this may also be interchangeably used as "branched alkyl group". A substituent which can substitute for the alkyl group may include at least one selected from the group consisting of halo (for example, F, Cl, Br, I), haloalkyl (for example, $CCl_3$ or $CF_3$), alkoxy, alkylthio, hydroxy, carboxy (—C(O)—OH), alkyloxy carbonyl (—C(O)—O—R), alkyl carbonyloxy (—O—C(O)—R), amino (—NH$_2$), carbamoyl (—NHC(O)OR— or —O—C(O)NHR—), urea (—NH—C(O)—NHR—), and thiol (—SH), but may not be limited thereto. Further, an alkyl group having two or more carbon atoms among the above-described alkyl groups may include at least one carbon-carbon double bond or at least one carbon-carbon triple bond, but may not be limited thereto. For example, the alkyl group may include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, acosanyl, or all the possible isomers thereof, but may not be limited thereto.

Hereinafter, embodiments and examples of the present disclosure will be described in detail with reference to the accompanying drawings. However, the present disclosure may not be limited to the following embodiments, examples, and drawings.

A first aspect of the present disclosure provides a cyclic polysulfane-based polymer which is obtained by polymerization of a sulfur-containing cyclic olefin monomer.

In an exemplary embodiment of the present disclosure, the sulfur-containing cyclic olefin monomer includes one represented by any one of the following Chemical Formulas 1-1 to 1-3, but may not be limited thereto.

[Chemical Formula 1-1]

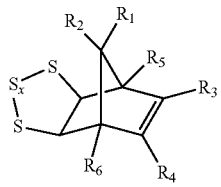

[Chemical Formula 1-2]

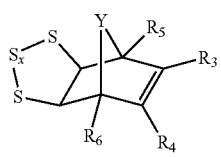

[Chemical Formula 1-3]

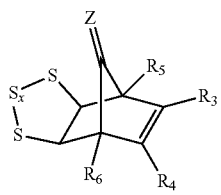

In an exemplary embodiment of the present disclosure, in Chemical Formulas 1-1 to 1-3, x may be from 1 to 5; each of $R_1$, $R_2$, $R_5$ and $R_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); each of $R_3$ and $R_4$ may be independently H or an alkyl group (non-limiting examples: a C1 to C25 linear or branched alkyl group or an isomer thereof); Y in Chemical Formula 1-2 may be NH, O, or S; and Z in Chemical Formula 1-3 may be O or S.

In an exemplary embodiment of the present disclosure, each of the alkyl groups described in Chemical Formulas 1-1 to 1-3 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, the cyclic polysulfane-based polymer may include one represented by any one of the following Chemical Formulas 2-1 to 2-3, but may not be limited thereto.

[Chemical Formula 2-1]

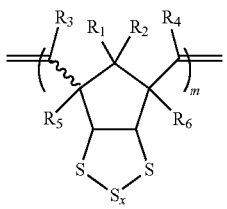

[Chemical Formula 2-2]

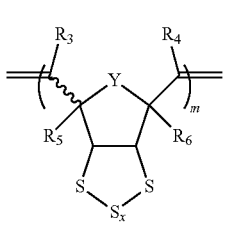

[Chemical Formula 2-3]

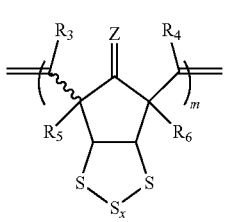

In an exemplary embodiment of the present disclosure, the substituents and x defined in Chemical Formulas 2-1 to 2-3 are the same as defined in Chemical Formulas 1-1 to 1-3.

That is, in Chemical Formulas 2-1 to 2-3, x may be from 1 to 5; m may be from 1 to 1000; each of $R_1$, $R_2$, $R_5$ and $R_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); each of $R_3$ and $R_4$ may be independently H or an alkyl group (non-limiting examples: a C1 to C25 linear or branched alkyl group or an isomer thereof); Y in Chemical Formula 1-2 may be NH, O, or S; and Z in Chemical Formula 1-3 may be O or S.

In an exemplary embodiment of the present disclosure, each of the alkyl groups described in Chemical Formulas 2-1 to 2-3 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, the sulfur content in the obtained cyclic polysulfane-based polymer can be controlled by controlling a feed ratio of the sulfur-containing cyclic olefin monomer, but may not be limited thereto.

In an exemplary embodiment of the present disclosure, a refractive index of the cyclic polysulfane-based polymer can be controlled by controlling the sulfur content in the cyclic polysulfane-based polymer, but may not be limited thereto.

A second aspect of the present disclosure provides a cyclic polysulfane-polynorbornene block copolymer which is obtained by copolymerizing a sulfur-containing cyclic olefin monomer with a soluble norbornene-based monomer.

In an exemplary embodiment of the present disclosure, the sulfur-containing cyclic olefin monomer may be represented by any one of Chemical Formulas 1-1 to 1-3 defined in the first aspect of the present disclosure and the soluble norbornene-based monomer may include one represented by any one of the following Chemical Formulas 3-1 to 3-6:

[Chemical Formula 1-1]
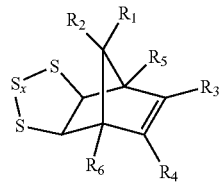

[Chemical Formula 1-2]
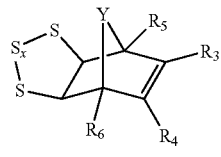

[Chemical Formula 1-3]
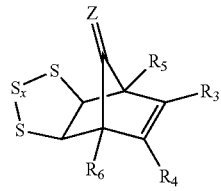

[Chemical Formula 3-1]
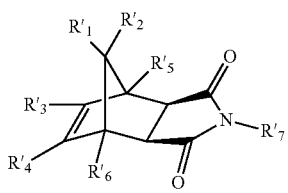

[Chemical Formula 3-2]
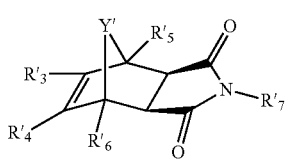

[Chemical Formula 3-3]
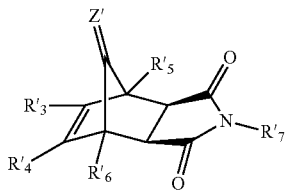

[Chemical Formula 3-4]
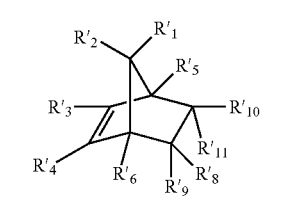

[Chemical Formula 3-5]
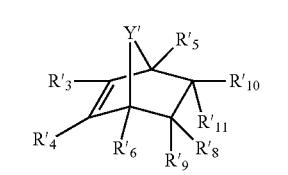

-continued

[Chemical Formula 3-6]
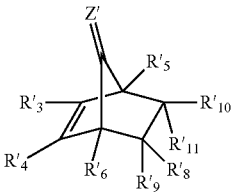

In an exemplary embodiment of the present disclosure, in Chemical Formulas 1-1 to 1-3, x may be from 1 to 5; each of $R_1$, $R_2$, $R_5$ and $R_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); each of $R_3$ and $R_4$ may be independently H or an alkyl group (non-limiting examples: a C1 to C25 linear or branched alkyl group or an isomer thereof); Y in Chemical Formula 1-2 may be NH, O, or S; and Z in Chemical Formula 1-3 may be O or S.

In an exemplary embodiment of the present disclosure, each of the alkyl groups described in Chemical Formulas 1-1 to 1-3 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, in Chemical Formulas 3-1 to 3-6, each of $R'_1$, $R'_2$, $R'_5$, and $R'_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); each of $R'_3$ and $R'_4$ may be independently H or an alkyl group (non-limiting examples: a C1 to C25 linear or branched alkyl group or an isomer thereof); $R'_7$ may be an alkyl group (non-limiting examples: a C1 to C25 linear or branched alkyl group or an isomer thereof) or a cycloalkyl group (non-limiting examples: a C3 to C10, C3 to C8, or C3 to C6 cycloalkyl group); Y' may be NH, O, or S; Z' may be O or S; and each of $R'_8$, $R'_9$, $R'_{10}$, and $R'_{11}$ in Chemical Formulas 3-4 to 3-6 may be independently be an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof).

In an exemplary embodiment of the present disclosure, each of the alkyl groups described in Chemical Formulas 3-1 to 3-6 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, the cyclic polysulfane-polynorbornene block copolymer may have solubility in an organic solvent, but may not be limited thereto.

In an exemplary embodiment of the present disclosure, the cyclic polysulfane-polynorbornene block copolymer may include one represented by any one of the following Chemical Formulas 4-1 to 4-18, but may not be limited thereto.

[Chemical Formula 4-1]

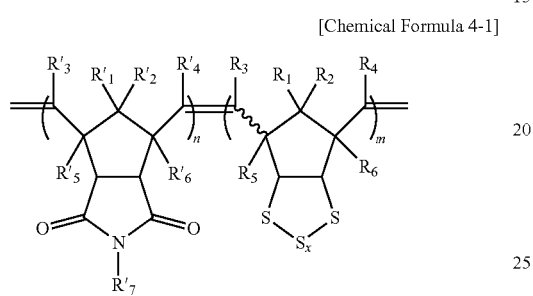

[Chemical Formula 4-2]

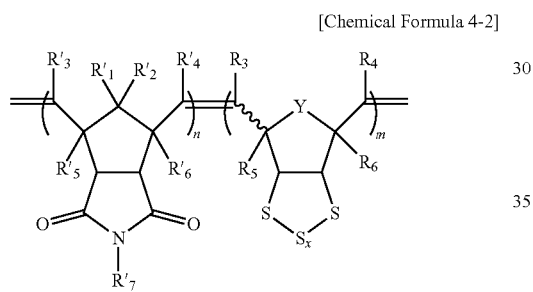

[Chemical Formula 4-3]

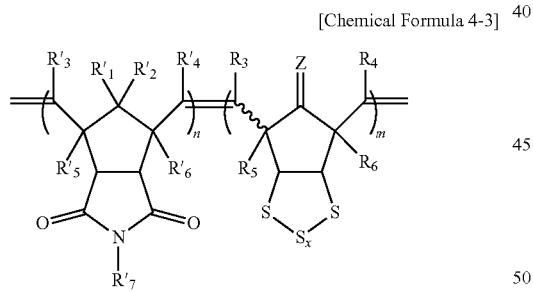

[Chemical Formula 4-4]

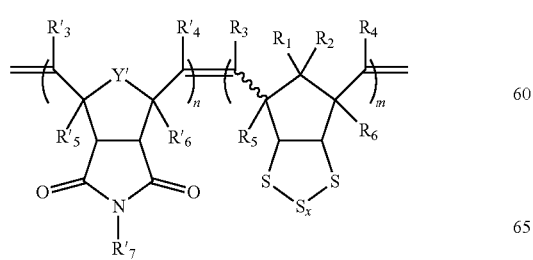

[Chemical Formula 4-5]

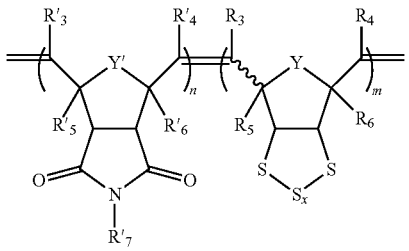

[Chemical Formula 4-6]

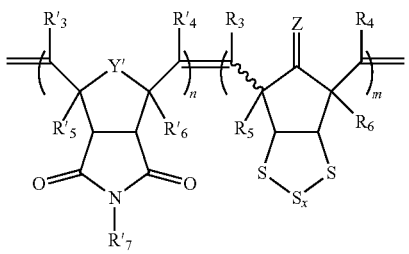

[Chemical Formula 4-7]

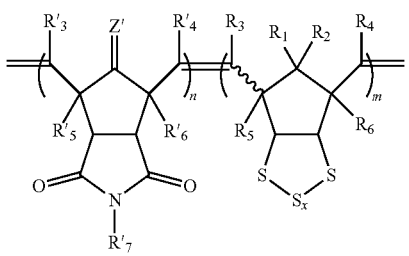

[Chemical Formula 4-8]

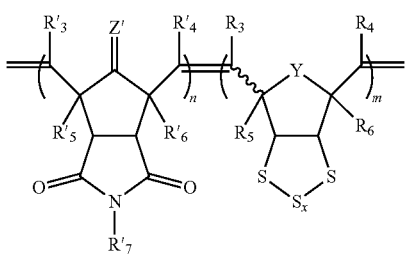

[Chemical Formula 4-9]

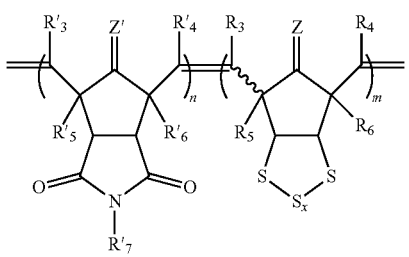

[Chemical Formula 4-10]

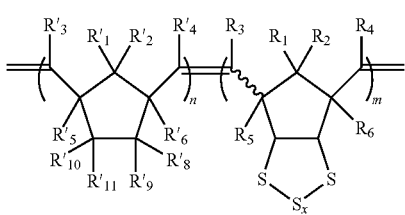

-continued

[Chemical Formula 4-11]
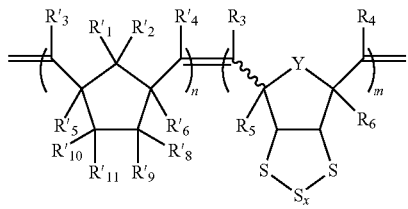

[Chemical Formula 4-12]
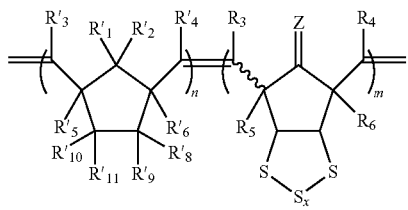

[Chemical Formula 4-13]
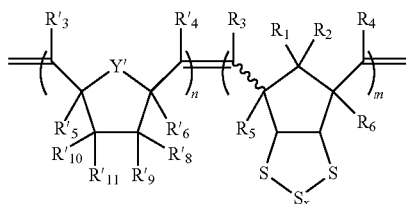

[Chemical Formula 4-14]
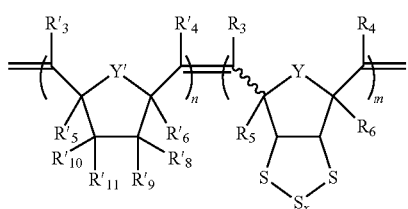

[Chemical Formula 4-15]
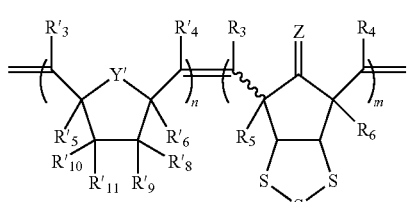

[Chemical Formula 4-16]
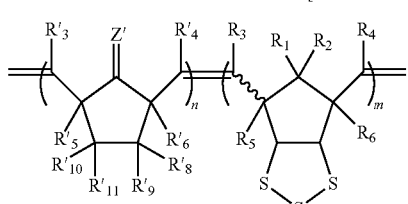

[Chemical Formula 4-17]
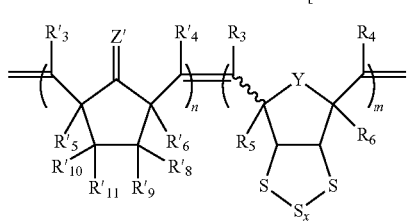

-continued

[Chemical Formula 4-18]
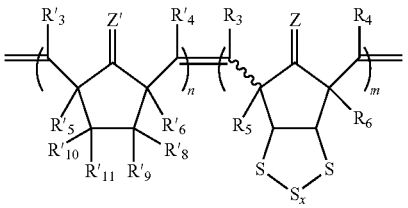

In an exemplary embodiment of the present disclosure, the substituents are the same as defined in Chemical Formulas 1-1 to 1-3 and Chemical Formulas 3-1 to 3-6.

That is, in an exemplary embodiment of the present disclosure, in Chemical Formulas 4-1 to 4-18, each of n and m may be independently from 1 to 1000; x may be from 1 to 5; each of $R_1$, $R_2$, $R_5$ and $R_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R'; a C1 to C25 linear or branched alkyl group or an isomer thereof); each of $R_3$ and $R_4$ may be independently H or an alkyl group (non-limiting examples: a C1 to C25 linear or branched alkyl group or an isomer thereof); each of $R'_1$, $R'_2$, $R'_5$ and $R'^6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); each of $R'_3$ and $R'_4$, may be independently H or an alkyl group (non-limiting examples: a C1 to C25 linear or branched alkyl group or an isomer thereof); $R'_7$ may be an alkyl group (non-limiting examples: a C1 to C25 linear or branched alkyl group or an isomer thereof) or a cycloalkyl group (non-limiting examples: a C3 to C10, to C3 to C8, or C3 to C6 cycloalkyl group); each of $R'_8$, $R'_9$, $R'_{10}$, and $R'_{11}$ may be independently an alkyl group (non-limiting examples: a C1 to C25 linear or branched alkyl group or an isomer thereof), a halogen (F, Cl, Br, and the like), —OR (non-limiting examples of R': a C1 to C25 linear or branched alkyl group or an isomer thereof), or —COOR' (non-limiting examples of R': a C1 to C25 linear or branched alkyl group or an isomer thereof); Y and Y' may be NH, O, or S; and Z and Z' may be O or S.

In an exemplary embodiment of the present disclosure, each of the alkyl groups described in Chemical Formulas 3-1 to 3-6 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, a ratio of the cyclic polysulfane block to the polynorbornene block in the cyclic polysulfane-polynorbornene block copolymer may be in the range of from about 1:0.001 to about 1:1000, but may not be limited thereto. For example, a ratio of the cyclic polysulfane block to the polynorbornene block may be in the range of from about 1:0.001 to about 1:1000, from about 1:0.001 to about 1:800, from about 1:0.001 to about 600, from about 1:0.001 to about 1:400, from about 1:0.001 to about 1:200, from about 1:0.001 to about 1:100, from about 1:0.01 to about 1:1000, from about 1:0.01 to about 1:800, from about 1:0.01 to about 1:600, from about 1:0.01 to about 1:400, from about 1:0.01 to about 1:200, from about 1:0.01 to about 1:100, from about 1:0.1 to about 1:1000, from about 1:0.1 to about 1:800, from about 1:0.1 to about 1:600, from about 1:0.1 to about 1:400, from about 1:0.1 to about 1:200, from about 1:0.1 to about 1:100, from about 1:1 to about 1:1000, from about 1:1 to about 1:800, from about 1:1 to about 1:600, from about 1:1 to about 1:400, from about 1:1 to about 1:200, from about 1:1 to about 1:100, from about 1:100 to about 1:1000, from about 1:100 to about 1:800, from about 1:100 to about 1:600, from about 1:100 to about 1:400, or from about 1:100 to about 1:200, but may not be limited thereto.

In an exemplary embodiment of the present disclosure, the cyclic polysulfane-polynorbornene block copolymer may have solubility in an organic solvent, but may not be limited thereto.

In an exemplary embodiment of the present disclosure, the cyclic polysulfane-polynorbornene block copolymer in which a soluble block and an insoluble block are cross-linked may be formed by sequentially supplying a norbornene-based monomer having solubility in the organic solvent and the sulfur-containing cyclic olefin monomer in a one-pot polymerization, but may not be limited thereto.

In an exemplary embodiment of the present disclosure, the cyclic polysulfane-polynorbornene block copolymer may have a nanoparticular form, but may not be limited thereto.

In an exemplary embodiment of the present disclosure, a size of the nanoparticle of the cyclic polysulfane-polynorbornene block copolymer may be about 500 nm or less, but may not be limited thereto. For example, a size of the nanoparticle of the copolymer may be about 500 nm or less, from about 5 nm to about 500 nm, from about 5 nm to about 400 nm, from about 5 nm to about 300 nm, from about 5 nm to about 200 nm, from about 5 nm to about 100 nm, from about 5 nm to about 50 nm, from about 50 nm to about 500 nm, from about 50 nm to about 400 nm, from about 50 nm to about 300 nm, from about 50 nm to about 200 nm, from about 50 nm to about 100 nm, from about 100 nm to about 500 nm, or from about 100 nm to about 300 nm, but may not be limited thereto.

In an exemplary embodiment of the present disclosure, the nanoparticle of the cyclic polysulfane-polynorbornene block copolymer may exhibit thermal stability, but may not be limited thereto.

In an exemplary embodiment of the present disclosure, the cyclic polysulfane-polynorbornene block copolymer may include the nanoparticle in a micelle form in which the polynorbornene block forms a shell on a core containing the cyclic polysulfane, but may not be limited thereto.

In an exemplary embodiment of the present disclosure, a size of the micelle may be about 500 nm or less, but may not be limited thereto. For example, a size of the micelle may be about 500 nm or less, from about 5 nm to about 500 nm, from about 5 nm to about 400 nm, from about 5 nm to about 300 nm, from about 5 nm to about 200 nm, from about 5 nm to about 100 nm, from about 5 nm to about 50 nm, from about 50 nm to about 500 nm, from about 50 nm to about 400 nm, from about 50 nm to about 300 nm, from about 50 nm to about 200 nm, from about 50 nm to about 100 nm, from about 100 nm to about 500 nm, or from about 100 nm to about 300 nm, but may not be limited thereto.

In an exemplary embodiment of the present disclosure, the cyclic polysulfane-polynorbornene block copolymer may have transmittance to visible light and/or near infrared light. For example, the cyclic polysulfane-polynorbornene block copolymer may have transmittance to visible light or light having a wavelength of from 400 nm to 1200 nm or from 400 nm to 1600 nm, but may not be limited thereto.

In an exemplary embodiment of the present disclosure, the polysulfane-polynorbornene block copolymer may have transmittance of about 90% or more, about 95% or more, about 97% or more, or about 99% or more in a range of visible light and/or near infrared light, but may not be limited thereto. For example, the polysulfane-polynorbornene block copolymer for a 200 nm-thick film may have transmittance of about 90% or more, about 95% or more, about 97% or more, or about 99% or more in the range of visible light and/or near infrared light, but may not be limited thereto.

A third aspect of the present disclosure provides a film including the cyclic polysulfane-based polymer according to the first aspect of the present disclosure or the cyclic polysulfane-polynorbornene block copolymer according to the second aspect of the present disclosure. Detailed descriptions of parts of the film according to the third aspect of the present disclosure, which overlap with those of the first aspect of the present disclosure, are omitted hereinafter, but the descriptions of the first aspect or the second aspect of the present disclosure may be identically applied to the third aspect of the present disclosure, even though they are omitted hereinafter.

In an exemplary embodiment of the present disclosure, the sulfur-containing cyclic olefin monomer may he represented by any one of Chemical Formulas 1-1 to 1-3 defined in the first aspect of the present disclosure and the soluble norbornene-based monomer may include one represented by any one of the following Chemical Formulas 3-1 to 3-6:

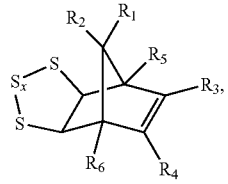

[Chemical Formula 1-1]

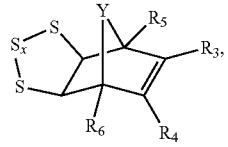

[Chemical Formula 1-2]

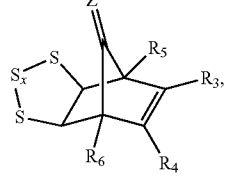

[Chemical Formula 1-3]

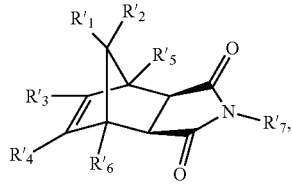

[Chemical Formula 3-1]

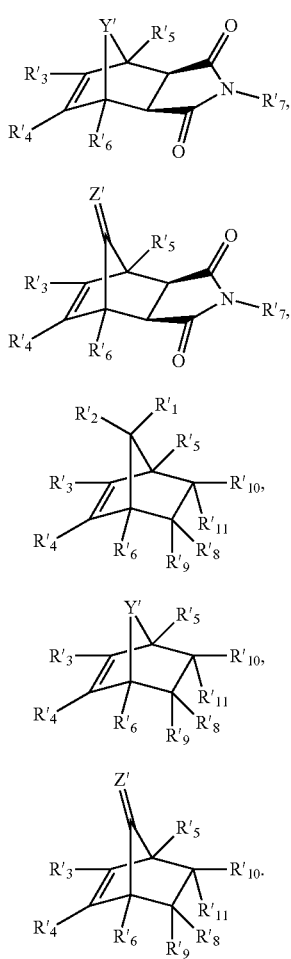

[Chemical Formula 3-2]

[Chemical Formula 3-3]

[Chemical Formula 3-4]

[Chemical Formula 3-5]

[Chemical Formula 3-6]

In an exemplary embodiment of the present disclosure, in Chemical Formulas 1-1 to 1-3, x may be from 1 to 5; each of $R_1$, $R_2$, $R_5$ and $R_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); each of $R_3$ and $R_4$ may be independently H or an alkyl group (non-limiting examples: a C1 to C25 linear or branched alkyl group or an isomer thereof); Y in Chemical Formula 1-2 may be NH, O, or S; and Z in Chemical Formula 1-3 may be O or S.

In an exemplary embodiment of the present disclosure, each of the alkyl groups described in Chemical Formulas 1-1 to 1-3 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, the cyclic polysulfane-based polymer may include one represented by any one of the following Chemical Formulas 2-1 to 2-3, but may not be limited thereto.

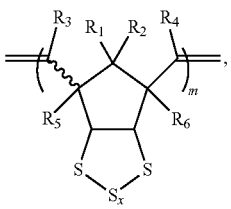

[Chemical Formula 2-1]

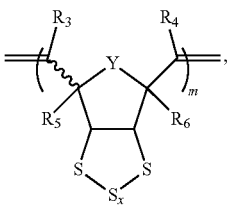

[Chemical Formula 2-2]

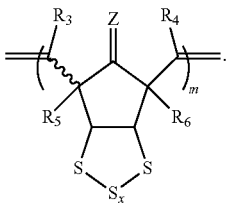

[Chemical Formula 2-3]

In an exemplary embodiment of the present disclosure, the substituents and x defined in Chemical Formulas 2-1 to 2-3 are the same as defined in Chemical Formulas 1-1 to 1-3.

That is, in Chemical Formulas 2-1 to 2-3, x may be from 1 to 5; m may be from 1 to 1000; each of $R_1$, $R_2$, $R_5$ and $R_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R'; a C1 to C25 linear or branched alkyl group or an isomer thereof); each of $R_3$ and $R_4$ may be independently H or an alkyl group (non-limiting examples: a C1 to C25 linear or branched alkyl group or an isomer thereof); Y in Chemical Formula 1-2 may be NH, O, or S; and Z in Chemical Formula 1-3 may be O or S.

In an exemplary embodiment of the present disclosure, each of the alkyl groups described in Chemical Formulas 2-1 to 2-3 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, the sulfur content in the obtained cyclic polysulfane-based polymer can be controlled by controlling a feed ratio of the sulfur-containing cyclic olefin monomer, but may not be limited thereto.

In an exemplary embodiment of the present disclosure, a refractive index of the cyclic polysulfane-based polymer can be controlled by controlling the sulfur content in the cyclic polysulfane-based polymer, but may not be limited thereto.

In an exemplary embodiment of the present disclosure, in Chemical Formulas 3-1 to 3-6, each of $R'_1$, $R'_2$, $R'_5$, and $R'_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R'; a C1 to C25 linear or branched alkyl group or an isomer thereof); each of $R'_3$ and $R'_4$ may be independently H or an alkyl group (non-limiting examples: a C1 to C25 linear or branched alkyl group or an isomer thereof); $R'_7$ may be an alkyl group (non-limiting examples: a C1 to C25 linear or branched alkyl group or an isomer thereof) or a cycloalkyl group (non-limiting examples: a C3 to C10, C3 to C8, or C3 to C6 cycloalkyl group); Y' may be NH, O, or S; Z' may be O or S; and each of $R'_8$, $R'_9$, $R'_{10}$, and $R'_{11}$ in Chemical Formulas 3-4 to 3-6 may be independently be H, an alkyl group(non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof).

In an exemplary embodiment of the present disclosure, each of the alkyl groups described in Chemical Formulas 3-1 to 3-6 may be independently a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, the cyclic polysulfane-polynorbornene block copolymer may have solubility in an organic solvent, but may not be limited thereto.

In an exemplary embodiment of the present disclosure, the cyclic polysulfane-polynorbornene block copolymer may include one represented by any one of the following Chemical Formulas 4-1 to 4-18, but may not be limited thereto:

[Chemical Formula 4-1]

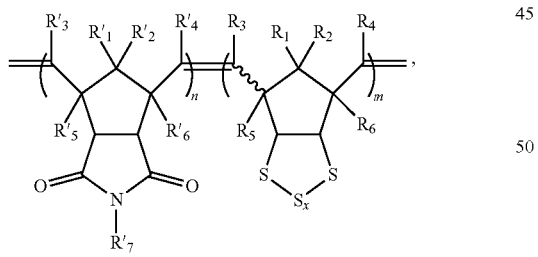

[Chemical Formula 4-2]

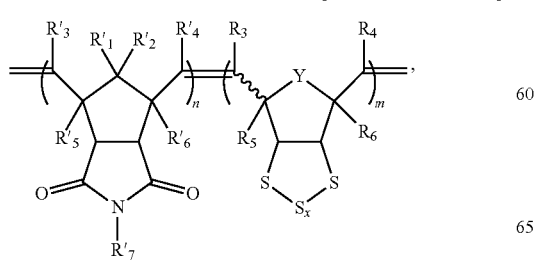

[Chemical Formula 4-3]

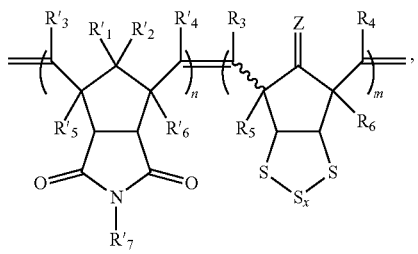

[Chemical Formula 4-4]

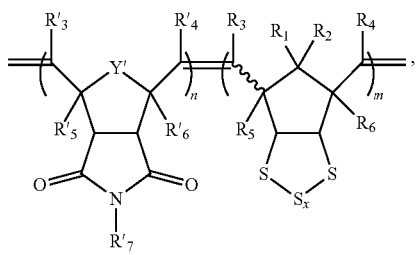

[Chemical Formula 4-5]

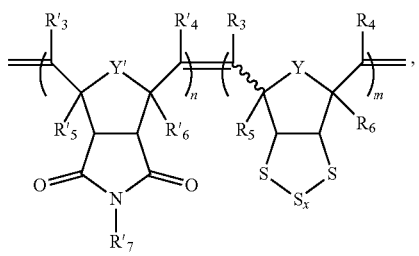

[Chemical Formula 4-6]

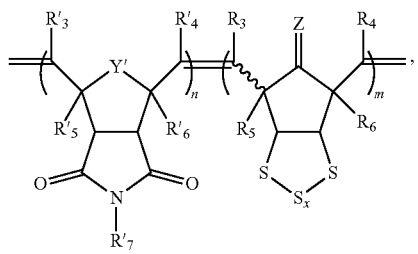

[Chemical Formula 4-7]

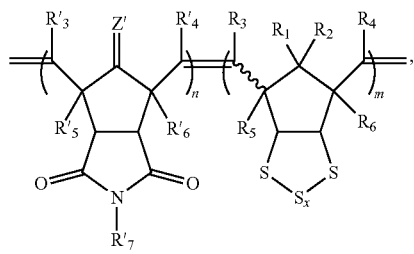

[Chemical Formula 4-8]

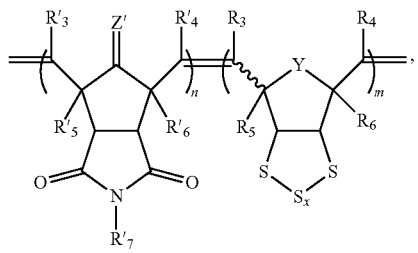

[Chemical Formula 4-9]

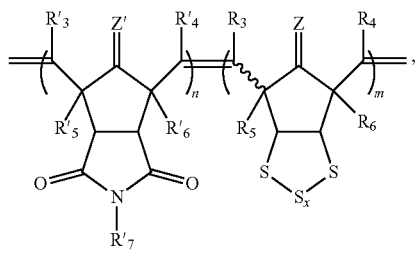

[Chemical Formula 4-10]

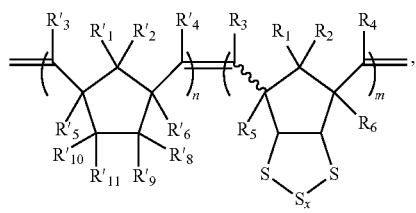

[Chemical Formula 4-11]

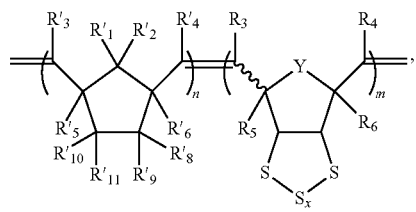

[Chemical Formula 4-12]

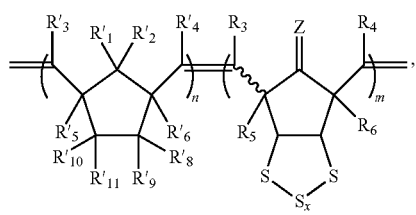

[Chemical Formula 4-13]

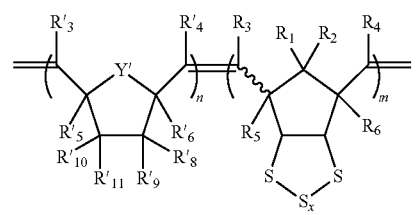

[Chemical Formula 4-14]

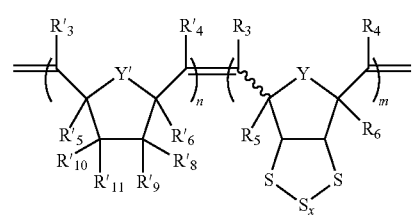

[Chemical Formula 4-15]

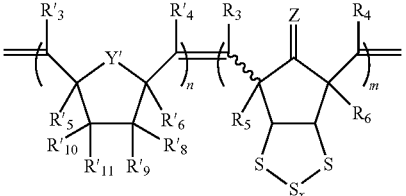

[Chemical Formula 4-16]

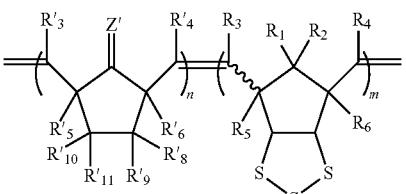

[Chemical Formula 4-17]

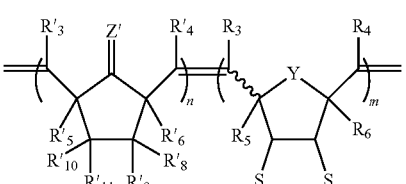

[Chemical Formula 4-18]

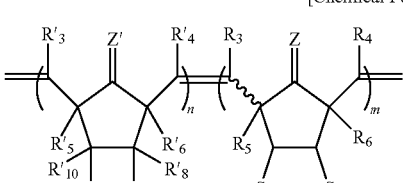

In an exemplary embodiment of the present disclosure, the substituents are the same as defined in Chemical Formulas 1-1 to 1-3 and Chemical Formulas 3-1 to 3-6.

That is, in an exemplary embodiment of the present disclosure, in Chemical Formulas 4-1 to 4-18, each of n and m may be independently from 1 to 1000; x may be from 1 to 5; each of $R_1$, $R_2$, $R_5$ and $R_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R: a C1 to C25 linear or branched alkyl group or an isomer thereof); each of $R_3$ and $R_4$ may be independently H or an alkyl group (non-limiting examples: a C1 to C25 linear or branched alkyl group or an isomer thereof); each of $R'_1$, $R'_2$, $R'_5$ and $R'_6$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); each of $R'_3$ and $R'_4$ may be independently H or an alkyl group (non-limiting examples: a C1 to C25 linear or branched alkyl group or an isomer thereof); $R'_7$ may be an alkyl group (non-limiting examples: a C1 to C25 linear or branched alkyl group or an isomer thereof) or a cycloalkyl group (non-limiting examples: a C3 to C10, C3 to C8, or C3 to C6 cycloalkyl group); each of $R'_8$, $R'_9$, $R'_{10}$, and $R'_{11}$ may be independently an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); Y and Y' may be NH, O, or S; and Z and Z' may be O or S.

In an exemplary embodiment of the present disclosure, each of the alkyl groups described in Chemical Formulas 3-1 to 3-6 may be a C1 to C25 linear or branched alkyl group or an isomer thereof, a C1 to C20 linear or branched alkyl group or an isomer thereof, a C1 to C15 linear or branched alkyl group or an isomer thereof, a C1 to C10 linear or branched alkyl group or an isomer thereof, a C1 to C6 linear or branched alkyl group or an isomer thereof, or a C1 to C4 linear or branched alkyl group or an isomer thereof.

In an exemplary embodiment of the present disclosure, a ratio of the cyclic polysulfane block to the polynorbornene block in the cyclic polysulfane-polynorbornene block copolymer may be in the range of from about 1:0.001 to about 1:1000, but may not be limited thereto. For example, a ratio of the cyclic polysulfane block to the polynorbornene block may be in the range of from about 1:0.001 to about 1:1000, from about 1:0.001 to about 1: 800, from about 1:0.001 to about 600, from about 1:0.001 to about 1:400, from about 1:0.001 to about 1:200, from about 1:0.001 to about 1:100, from about 1:0.01 to about 1:1000, from about 1:0.01 to about 1:800, from about 1:0.01 to about 1:600, from about 1:0.01 to about 1:400, from about 1:0.01 to about 1:200, from about 1:0.01 to about 1:100, from about 1:0.1 to about 1:1000, from about 1:0.1 to about 1:800, from about 1:0.1 to about 1:600, from about 1:0.1 to about 1:400, from about 1:0.1 to about 1:200, from about 1:0.1 to about 1:100, from about 1:1 to about 1:1000, from about 1:1 to about 1:800, from about 1:1 to about 1:600, from about 1:1 to about 1:400, from about 1:1 to about 1:200, from about 1:1 to about 1:100, from about 1:100 to about 1:1000, from about 1:100 to about 1:800, from about 1:100 to about 1:600, from about 1:100 to about 1:400, or from about 1:100 to about 1:200, but may not be limited thereto.

In an exemplary embodiment of the present disclosure, the cyclic polysulfane-polynorbornene block copolymer may have solubility in an organic solvent, but may not be limited thereto.

In an exemplary embodiment of the present disclosure, the cyclic polysulfane-polynorbornene block copolymer in which a soluble block and an insoluble block are cross-linked may be formed by sequentially supplying a norbornene-based monomer having solubility in the organic solvent and the sulfur-containing cyclic olefin monomer in a one-pot polymerization, but may not be limited thereto.

In an exemplary embodiment of the present disclosure, the cyclic polysulfane-polynorbornene block copolymer may have a nanoparticular form, but may not be limited thereto.

In an exemplary embodiment of the present disclosure, a size of the nanoparticle of the cyclic polysulfane-polynorboreneblock copolymer may be about 500 nm or less, but may not be limited thereto. For example, a size of the nanoparticle of the copolymer may be about 500 nm or less, from about 5 nm to about 500 nm, from about 5 nm to about 400 nm, from about 5 nm to about 300 nm, from about 5 nm to about 200 nm, from about 5 nm to about 100 nm, from about 5 nm to about 50 nm, from about 50 nm to about 500 nm, from about 50 nm to about 400 nm, from about 50 nm to about 300 nm, from about 50 nm to about 200 nm, from about 50 nm to about 100 nm, from about 100 nm to about 500 nm, or from about 100 nm to about 300 nm, but may not be limited thereto.

In an exemplary embodiment of the present disclosure, the nanoparticle of the cyclic polysulfane-polynorbornene block copolymer may exhibit thermal stability, but may not be limited thereto.

In an exemplary embodiment of the present disclosure, the cyclic polysulfane-polynorbornene block copolymer may include the nanoparticle in a micelle form in which the polynorbornene block forms a shell on a core containing the cyclic polysulfane, but may not be limited thereto.

In an exemplary embodiment of the present disclosure, a size of the micelle may be about 500 nm or less, but may not be limited thereto. For example, a size of the micelle may be about 500 nm or less, from about 5 nm to about 500 nm, from about 5 nm to about 400 nm, from about 5 nm to about 300 nm, from about 5 nm to about 200 nm, from about 5 nm to about 100 nm, from about 5 nm to about 50 nm, from about 50 nm to about 500 nm, from about 50 nm to about 400 nm, from about 50 nm to about 300 nm, from about 50 nm to about 200 nm, from about 50 nm to about 100 nm, from about 100 nm to about 500 nm, or from about 100 nm to about 300 nm, but may not be limited thereto.

In an exemplary embodiment of the present disclosure, the cyclic polysulfane-polynorbornene block copolymer may have transmittance to visible light and/or near infrared light. For example, the cyclic polysulfane-polynorbornene block copolymer may have transmittance to visible light or light having a wavelength of from 400 nm to 1200 nm or from 400 nm to 1600 nm, but may not be limited thereto.

In an exemplary embodiment of the present disclosure, the polysulfane-polynorbornene block copolymer may have transmittance of about 90% or more, about 95% or more, about 97% or more, or about 99% or more in a range of visible light and/or near infrared light, but may not be limited thereto. For example, the polysulfane-polynorbornene block copolymer for a 200 nrri-thick film may have transmittance of about 90% or more, about 95% or more, about 97% or more, or about 99% or more in the range of visible light and/or near infrared light, but may not be limited thereto.

In an exemplary embodiment of the present disclosure, the film including the cyclic polysulfane-polynorbornene block copolymer may have an improved refractive index as compared to a polynorbornene polymer, but may not be limited thereto.

In an exemplary embodiment of the present disclosure, a refractive index of the film including the cyclic polysulfane-polynorbornene block copolymer may exhibit a refractive index increase of 0.02 or more in the range of visible light and/or near infrared light as compared with a polynorbornene polymer, but may not be limited thereto.

In an exemplary embodiment of the present disclosure, a refractive index of the cyclic polysulfane-polynorbornene block copolymer can be controlled by controlling the sulfur content in the cyclic polysulfane-based polymer, but may not be limited thereto. In an exemplary embodiment of the present disclosure, the refractive index of the block copolymer may be controlled in the range of from about 1.5 to about 1.8, but may not be limited thereto. For example, the refractive index of the block copolymer may be controlled in the range of from about 1.5 to about 1.8, from about 1.5 to about 1.75, from about 1.5 to about 1.7, or from about 1.5 to about 1.65, but may not be limited thereto.

In an exemplary embodiment of the present disclosure, the nanoparticle of the cyclic polysulfane-polynorbornene block copolymer may exhibit thermal stability, but may not be limited thereto.

In an exemplary embodiment of the present disclosure, the cyclic polysulfane-polynorbornene block copolymer may include the nanoparticle in a micelle form in which the polynorbornene block forms a shell on a core containing the cyclic polysulfane, but may not be limited thereto.

In an exemplary embodiment of the present disclosure, a size of the micelle may be about 500 nm or less, but may not be limited thereto. For example, a size of the micelle may be about 500 nm or less, from about 5 nm to about 500 nm, from about 5 nm to about 400 nm, from about 5 nm to about 300 nm, from about 5 nm to about 200 nm, from about 5 nm to about 100 nm, from about 5 nm to about 50 nm, from about 50 nm to about 500 nm, from about 50 nm to about 400 nm, from about 50 nm to about 300 nm, from about 50 nm to about 200 nm, from about 50 nm to about 100 nm, from about 100 nm to about 500 nm, or from about 100 nm to about 300 nm, but may not be limited thereto.

In an exemplary embodiment of the present disclosure, the cyclic polysulfane-polynorbornene block copolymer may have transmittance to visible light and/or near infrared light. For example, the cyclic polysulfane-polynorbornene block copolymer may have transmittance to visible light or light having a wavelength of from 400 nm to 1200 nm or from 400 nm to 1600 nm, but may not be limited thereto.

In an exemplary embodiment of the present disclosure, the polysulfane-polynorbornene block copolymer may have transmittance of about 90% or more, about 95% or more, about 97% or more, or about 99% or more in a range of visible light and/or near infrared light, but may not be limited thereto. For example, the polysulfane-polynorbornene block copolymer for a 200 nm-thick film ay have transmittance of about 90% or more, about 95% or more, about 97% or more, or about 99% or more in the range of visible light and/or near infrared light, but may not be limited thereto.

A fourth aspect of the present disclosure provides a method of preparing the cyclic polysulfane-based polymer according to the first aspect of the present disclosure, including: one-pot polymerizing a sulfur-containing cyclic olefin monomer in the presence of a phosphine-free third generation Grubbs catalyst to obtain the cyclic polysulfane-based polymer. Detailed descriptions of parts of the fourth aspect of the present disclosure, which overlap with those of the first aspect of the present disclosure, are omitted hereinafter, but the descriptions of the first aspect of the present disclosure may be identically applied to the fourth aspect of the present disclosure, even though they are omitted hereinafter.

In an aspect of the present disclosure, the sulfur-containing cyclic olefin monomer may be represented by any one of Chemical Formulas 1-1 to 1-3 defined in the first aspect of the present disclosure and the cyclic polysulfane-based polymer may include one represented by any one of the following Chemical Formulas 2-1 to 2-3 defined in the first aspect of the present disclosure.

In an exemplary embodiment of the present disclosure, the catalyst may be represented by the following Chemical Formula 5-1 or 5-2, but may not be limited thereto:

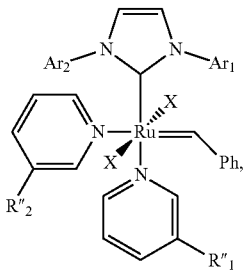

[Chemical Formula 5-1]

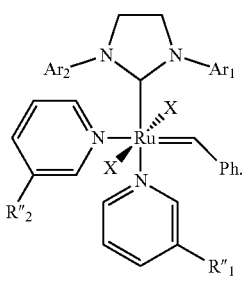

[Chemical Formula 5-2]

In an exemplary embodiment of the present disclosure, in Chemical Formulas 5-1 and 5-2 representing the catalyst, X may be halogen such as F, Cl, Br, and the like; each of $R''_1$ and $R''_2$ may be independently H, an alkyl group (non-limiting examples: a C1 to C25 linear or branched alkyl group or an isomer thereof), a halogen (F, Cl, Br, and the like), —OR (non-limiting examples of R: a C1 to C25 linear or branched alkyl group or an isomer thereof), or —COOR' (non-limiting examples of R': a C1 to C25 linear or branched alkyl group or an isomer thereof); and each of $Ar_1$ and $Ar_2$ may be independently a phenyl group (non-limiting examples: phenyl, tolyl, xylyl, or mesityl) which may be substituted by a C1 to C6, C1 to C4 or C1 to C3 linear or branched alkyl group.

In an exemplary embodiment of the present disclosure, the sulfur content in the obtained cyclic polysulfane-based polymer can be controlled by controlling the feed ratio of the sulfur-containing cyclic olefin monomer, but may not be limited thereto. For example, the feed ratio of the sulfur-containing cyclic olefin monomer (the molar amount of the sulfur-containing cyclic olefin monomer)/(the molar amount of the sulfur-containing cyclic olefin monomer+the molar amount of another monomer which does not contain sulfur) may be more than 0 to 0.99, but may not be limited thereto. For example, the feed ratio of the sulfur-containing cyclic olefin monomer may be in the range of from about 0.1 to about 0.5 in terms of controlling a refractive index of the obtained polymer, but may not be limited thereto.

In an exemplary embodiment of the present disclosure, a refractive index of the cyclic polysulfane-based polymer can be controlled by controlling the sulfur content in the cyclic polysulfane-based polymer, but may not be limited thereto.

In an exemplary embodiment of the present disclosure, the sulfur-containing cyclic olefin monomer and the third generation Grubbs catalyst may be in the form of being dissolved in an organic solvent, but may not be limited thereto. For example, the organic solvent may include a member selected from the group consisting of acetone, methylethylketone, methylbutylketone, ethyl ether, dioxane, tetrahydrofuran, isobutyl alcohol, isopropyl alcohol, dichloromethane, chloroform, dichloroethane, trichloroethane, tetrachloroethane, dichloroethylene, trichloroethylene, tetrachloroethylene, chlorobenzene, benzene, toluene, and combinations thereof, but may not be limited thereto.

In an exemplary embodiment of the present disclosure, after the polymerization, the polymerization reaction may be ended using a reaction terminating material, but may not be limited thereto. For example, the reaction terminating material may include vinyl ether, vinyl ester, or functional derivatives including the vinyl ether or vinyl ester, but may not be limited thereto.

In an exemplary embodiment of the present disclosure, the vinyl ether may include ethyl vinyl ether, methyl vinyl ether, isobutyl vinyl ether, or tetrabutyl vinyl ether, but may not be limited thereto.

In an exemplary embodiment of the present disclosure, the vinyl ester may include formic acid vinyl, acetic acid vinyl, acrylic acid vinyl, butyric acid vinyl, crotonic acid vinyl, lauric acid vinyl, chloroacetic acid vinyl, or stearic acid vinyl, but may not be limited thereto.

A fifth aspect of the present disclosure provides a method of preparing the cyclic polysulfane-polynorbornene block copolymer according to the second aspect of the present disclosure, including: polymerizing a soluble norbornene-based monomer in the presence of a phosphine-free third-generation Grubbs catalyst, followed by copolymerization with a sulfur-containing cyclic olefin monomer to form a cyclic polysulfane-polynorbornene block copolymer. Detailed descriptions of parts of the fifth aspect of the present disclosure, which overlap with those of the first aspect or the second aspect of the present disclosure, are omitted hereinafter, but the descriptions of the first aspect or the second aspect of the present disclosure may be identically applied to the fifth aspect of the present disclosure, even though they are omitted hereinafter.

In an exemplary embodiment of the present disclosure, the soluble norbornene-based monomer may include one represented by any one of Chemical Formulas 3-1 to 3-6 defined in the second aspect of the present disclosure, the cyclic olefin monomer may include one represented by any one of Chemical Formulas 1-1 to 1-3 defined in the first aspect and the second aspect of the present disclosure, the catalyst may include one represented by Chemical Formula 5-1 or 5-2 defined in the fourth aspect of the present disclosure, and the cyclic polysulfane-polynorbomene block copolymermay include one represented by any one of the following Chemical Formulas 4-1 to 4-18 defined in the second aspect of the present disclosure.

In an exemplary embodiment of the present disclosure, the sulfur content in the obtained cyclic polysulfane-polynorbornene block copolymer can be controlled by controlling the feed ratio of the sulfur-containing cyclic olefin monomer, but may not be limited thereto. For example, the feed ratio of the sulfur-containing cyclic olefin monomer (the molar amount of the sulfur-containing cyclic olefin monomer)/(the molar amount of the sulfur-containing cyclic olefin monomer +the molar amount of the soluble norbornene-based monomer) may be more than 0 to 0.99, but may not be limited thereto. For example, the feed ratio of the sulfur-containing cyclic olefin monomer may be in the range of from about 0.1 to about 0.5 in terms of controlling a refractive index of the obtained polymer, but may not be limited thereto.

In an exemplary embodiment of the present disclosure, the refractive index of the cyclic polysulfane-polynorbornene block copolymer can be controlled by controlling the sulfur content in the cyclic polysulfane-polynorbornene Hock copolymer, but may not be limited thereto.

In an exemplary embodiment of the present disclosure, the soluble norbornene-based monomer with the third generation Grubbs catalyst and the sulfur-containing cyclic olefin monomer may be in the form of being dissolved in an organic solvent, but may not be limited thereto. For example, the organic solvent may include a member selected from the group consisting of acetone, methylethylketone, methylbutylketone, ethyl ether, dioxane, tetrahydrobutane, isobutyl alcohol, isopropyl alcohol, dichloromethane, chloroform, dichloroethane, trichloroethane, tetrachloroethane, dichloroethylene, trichloroethylene, tetrachloroethylene, chlorobenzene, benzene, toluene, and combinations thereof, but may not be limited thereto.

In an exemplary embodiment of the present disclosure, after the polymerization, the polymerization reaction may be ended using a reaction terminating material, but may not be limited thereto. For example, the reaction terminating material may include vinyl ether, vinyl ester, or functional derivatives including the vinyl ether or vinyl ester, but may not be limited thereto.

In an exemplary embodiment of the present disclosure, the vinyl ether may include ethyl vinyl ether, methyl vinyl ether, isobutyl vinyl ether, or tetrabutyl vinyl ether, but may not be limited thereto.

In an exemplary embodiment of the present disclosure, the vinyl ester may include formic acid vinyl, acetic acid vinyl, acrylic acid vinyl, butyric acid vinyl, crotonic acid vinyl, lauric acid vinyl, chloroacetic acid vinyl, or stearic acid vinyl, but may not be limited thereto.

In an exemplary embodiment of the present disclosure, a copolymer in which a soluble norbornene-based block and an insoluble sulfur-containing cyclic olefin block are cross-linked may be formed by sequentially supplying a norhornene-based monomer haying high solubility and the sulfur-containing cyclic olefin monomer in a one-pot polymerization, but may not be limited thereto.

In an exemplary embodiment of the present disclosure, the cyclic polysulfane-polynorbornene block copolymer may include the nanoparticle in a micelle Form in which the polynorbornene block forms a shell on a core containing the cyclic polysulfane, but may not be limited thereto.

In an exemplary embodiment of the present disclosure, a size of the micelle may be about 500 nm or less, but may not be limited thereto. For example, a size of the micelle may be about 500 nm or less, from about 5 nm to about 500 nm, from about 5 nm to about 400 nm, from about 5 nm to about 300 nm, from about 5 nm to about 200 nm, from about 5 nm to about 100 nm, from about 5 nm to about 50 nm, from about 50 nm to about 500 nm, from about 50 nm to about 400 nm, from about 50 nm to about 300 nm, from about 50 nm to about 200 nm, from about 50 nm to about 100 nm, from about 100 nm to about 500 nm, or from about 100 nm to about 300 nm, but may not be limited thereto.

Mode for Carrying Out the Invention

Hereinafter, the present disclosure will be explained in more detail with reference to Examples. However, the following Examples are illustrative only for better understanding of the present disclosure but do not limit the present disclosure.

EXAMPLES

Materials and Methods

All air- and moisture-sensitive procedures were conducted under nitrogen atmosphere using standard Schlenk techniques. NMR spectra were obtained from a Bruker Avance-300 MHz spectrometer, and all proton chemical shifts were referenced to residual proton resonance of CDCl$_3$ (7.26 ppm). UV-Vis absorption spectra were obtained with a PerkinElmer Lambda after correcting for background with a solvent-filled cuvette. Typical concentration of polymer nanoparticles for UV-Vis measurements was 0.1 mg/mL. Dynamic light scattering (DLS) for nanoparticle size and size distribution measurements was conducted on a Malvern Zetasizer Nano ZS90 using intensity-based distribution. Transmission electron microscopy (TEM) images were obtained on a Carl Zeiss LIBRA 120 microscope using 120 kV acceleration voltage. Samples were cast onto carbon-coated copper grids from chloroform solutions (0.05 mg/mL) for size control studies and from chlorobenzene solutions (0.05 mg/mL) for heating experiments. Scanning electron microscopy (SEM) images were obtained from a JEOL JSM-6701F microscope. Average diameter of polymer nanoparticles and standard deviations were calculated by averaging 30 particles from TEM or SEM images using ImageJ software (developed at the National Institute of Health). Elemental analysis was conducted on a Thermo Scientific Flash 2000 CHNS/O Analyzer. X-ray photoelectron spectroscopy (XPS) was carried out on a Kratos AXIS-HSi. Ellipsometry was done using a Gaertner Scientific Corporation Stokes Waferskan Ellipsometer L2W15S830 at two fixed wavelengths (632.8 nm HeNe gas laser and 830.0 nm laser diode). High-resolution mass spectrometry (HRMS) was obtained at the Seoul National University National Center Inter-University Research Facilities using EI ionization technique. Analytical thin-layer chromatography (TLC) was performed using Merck Kieselgel 60E-254 plates, and column chromatography was carried out using Merck silica gel 60 (70 to 230 mesh). Spectral grade solvents were used as purchased. Dichloromethane (DCM) was distilled over calcium hydride and degassed by bubbling argon through directly prior to use. Monomer N-cyclohexyl-exo-norbornene-5,6-dicarboximide (ChNDI) was prepared according to literature procedures. A third-generation Grubbs catalyst used in the present Example was prepared according to previous reports. All other commercially available chemicals were used as received.

Example 1

Preparation of Sulfur-containing Cyclic Polysulfane Monomer (CPM)

In order to prepare a sulfur-containing cyclic polysulfane monomer (CPM) represented by the following Chemical Formula 6, a mixture of elemental sulfur (5.0 g, 160 mmol S8) and anhydrous, degassed dimethylformamide (50 mL) under argon was heated to 100° C. Norbornadiene (4.0 mL, 39 mmol), passed through a plug of basic alumina directly prior to use, was then added. After stirring further at 100° C. for 5 hours, the reactant was poured into deionized water (600 mL) and subsequently extracted with diethyl ether. The ethereal layer was washed once with water, dried over magnesium sulfate, and concentrated in vacuo. The resulting dark brown oil was subjected to column chromatography (silica gel, 9:1 hexanes/DCM) to give a mixture of pentathiepane, trithiolane, and episulfide derivatives. The product mixture was further subjected to vacuum (50 mTorr) for 24 hours to afford exclusively the pentathiepane (x=3) and triothiolane (x=1) derivatives in 1:4.8 molar ratio (as determined through $^1$H NMR, according to proton resonance assignments provided in the literature) as a pale yellow oil (408 mg, 5.2%). HRMS (EI): calcd. (x =1) 187.9788, found 187.9788. calcd. (x=3) 251.9230, found 251.9229. Cyclic Polysulfane Monomer (CPM, 1).

[Chemical Formula 6]

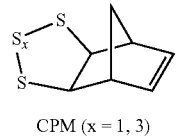

CPM (x = 1, 3)

Example 2

Synthesis of Cyclic Polysulfane-based Polymer

The cyclic polysulfane monomer prepared in Example 1 was polymerized through ring-opening metathesis polymerization (ROMP). Each of the sulfur-containing cyclic polysulfane monomer (CPM) represented by the following Chemical Formula 6 and synthesized in Example 1 and the third-generation Grubbs catalyst represented by the following Chemical Formula 7 was dissolved in dichloromethane, and each of the solutions was reacted at room temperature with stirring under nitrogen conditions. Herein, the amount of dichloromethane was used in order for an initial molar concentration of the monomer during the reaction to be 0.3. After the completion of the reaction, ethyl vinyl ether was added thereto for further reaction for about 30 minutes, and then, the reaction was ended. After the reaction, the dichloromethane solution was added into excess methanol to precipitate the synthesized cyclic polysulfane-based polymer. The precipitate was filtered through a filter paper to separate the cyclic polysulfane-based polymer.

[Chemical Formula 6]

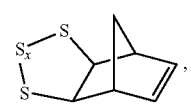

CPM (x = 1, 3)

[Chemical Formula 7]

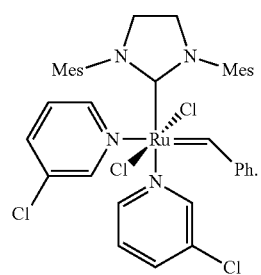

In the present Example, we report a polymerization of high sulfur-content, cyclic polysulfane monomer (CPM) through ring-opening metathesis polymerization using the fast-initiating and phosphine-free third-generation Grubbs catalyst previously reported to be an effective catalyst for the synthesis of well-defined block copolymers. While the sulfur-containing CPM is soluble in common organic solvents, a cyclic polysulfane-based polymer polymerized using the sulfur-containing CPM is insoluble. By employing the sulfur-containing CPM, such solubility behavior could be utilized for a one-pot preparation of block copolymer nanoparticles. Furthermore, the size and sulfur content of the nanoparticles could be readily controlled, and the changes in sulfur content led directly to control over the refractive index of the block copolymers.

Example 3

Synthesis of Cyclic Polysulfane-polynorbornene Block Copolymer 3-1: Procedure for Synthesis of Block Copolymer pChNDI$_{100}$-b-pCPM$_m$ In order to synthesize a cyclic polysulfane-polynorbornene block copolymer as shown in the following Scheme 1, N-cyclohexyl-exo-norbornene-5,6-dicarboxmide (ChNDI, 80.0 mg, 0.326 mmol) represented by the following Chemical Formula 8 in a 0.5 mL solvent and the third generation Grubbs catalyst (2.37 mg, 0.00326 mmol) represented by the following Chemical Formula 7 in a 0.5 mL DCM solvent were prepared in separate oven-dried vials under argon atmosphere. A ChNDI solution was then transferred to the catalyst solution under stirring. After stirring at room temperature for 20 minutes, a desired amount of CPM in a DCM solvent was added so that the final concentration of CPM in the polymerization mixture was 0.49 M. The reaction was stirred for additional 5 hours followed by an addition of excess ethyl vinyl ether. After stirring in the presence of ethyl vinyl ether for 20 minutes, the reactant was carefully poured into vigorously stirred methanol and the cyclic polysulfane-polynorbornene block copolymer represented by the following Chemical Formula 9 was obtained as an off-white precipitate. The cyclic polysulfane-polynorbornene block copolymer was synthesized to have various n:m ratios depending on the amount of CPM used in the cyclic polysulfane-polynorbornene block copolymer, and in the present Example, the block copolymers were synthesized to have n:m ratios of 100:20 (CPM 0.0652 mmol), 100:40 (CPM 0.130 mmol), 100:80, and 100:100, respectively. The block copolymer was further purified by iterative dissolution/reprecipitation using DCM and methanol followed by drying under vacuum at room temperature (Yield: 51% to 62%). $^1$H NMR (300 MHz, CDCl$_3$) for pChNDI$_{100}$-b-pCPM$_{40}$: δ 5.74 (1H), 5.40-5.60 (1H), 3.86 (1H), 3.33 (1H), 2.60-3.15 (3H), 2.10 (3H), 1.79 (2H), 1.48-1.68 (4H), 1.1-1.35 (3H). The copolymer, pChNDI, had identical $^1$H NMR spectrum. Anal. Calcd for pChNDI$_{100}$-b-pCPM$_{20}$: C, 68.10; H, 7.17; N 4.76; S, 8.44. Found: C, 68.04; H, 7.17; N, 4.65; S. 7.12. Anal. Calcd for pChNDI$_{100}$-b-pCPM$_{40}$: C, 64.79; H, 6.76; N 4.08; S, 15.05. Found: C, 66.18; H, 6.83; N, 4.33; S. 12.98.

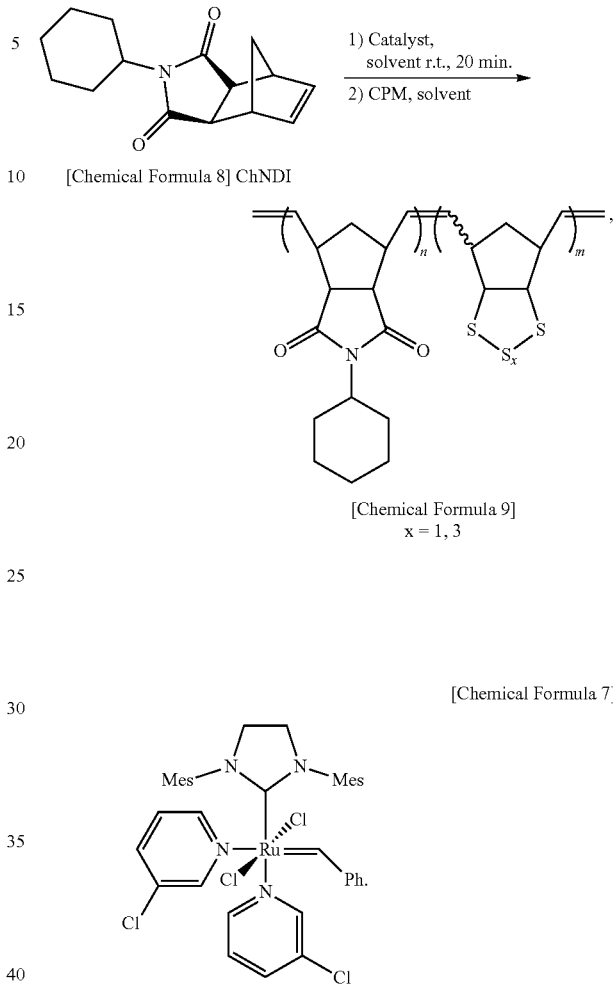

[Scheme 1]

[Chemical Formula 8] ChNDI

[Chemical Formula 9]
x = 1, 3

[Chemical Formula 7]

3-2: Procedure for Synthesis of Block Copolymer pChNDI$_{50}$-b-pCPM$_m$

In order to study nanoparticle size control, reactions were carried out using the general conditions for pChNDI$_{100}$-b-pCPM$_m$ as shown in the above-described Example. Detailed reaction conditions and the corresponding nanoparticle size as determined from DLS studies is summarized below.

TABLE 1

| Feed Ratio (M/I) | | | Concentration (M) | | Reaction Time | | Conversion[a] | | | DLS |
|---|---|---|---|---|---|---|---|---|---|---|
| ChNDI | CPM | Solvent | 1st block | 2nd block | 1st block | 2nd block | 1st block | 2nd block | Real DP | (nm, CHCl$_3$) |
| 50 | 25 | DCM | 0.4 | 0.1 | 10 min | 1 h | Full | Full | 50:25 | 28.62 |
| 50 | 50 | DCM | 0.3 | 0.2 | 15 min | 5 h | Full | 97% | 50:48 | 36.35 |
| 50 | 100 | DCM | 0.3 | 0.3 | 15 min | 12 h | Full | 75% | 50:75 | 44.83 |
| 50 | 100 | DCM | 0.3 | 0.35 | 15 min | 5 h | Full | 86% | 50:86 | 46.97 |
| 50 | 100 | THF | 0.5 | 0.5 | 20 min | 4 h 40 min | 95% | 98% | 48:98 | 49.62 |

[a]Determined through the ratio of integrals of polymer olefin resonance and monomer olefin resonance in $^1$H NMR spectrum.

The sulfur-containing cyclic polysulfane monomer, CPM, was prepared using a modified version of reported procedures and was obtained as a mixture of trithiolane (x=1) and pentathiepane (x=3) in a 4.8:1 molar ratio. Attempts to directly polymerize the CPM by treating the monomer solution in DCM with a solution of catalyst led immediately to the formation of a white, insoluble precipitate even at very low (<10%) monomer conversion, suggesting that the sulfur-rich polymer is insoluble even at very low degrees of polymerization. When the cyclic polysulfane-polynorbornene block copolymers were prepared by first conducting a living ROMP of soluble norbornene-based monomer followed by the addition of CPM at room temperature, the polymerization proceeded without precipitate formation.

TABLE 2

| Entry | Solvent | [2]:[ChNDI]:[1] | Concentration (mM)$^a$ | Time (h) | Conv. (%) | $DP_{CPM}{}^b$ |
|---|---|---|---|---|---|---|
| 1 | DCM | 1:50:50 | 300 | 5 | 97 | 48 |
| 2 | DCM | 1:50:100 | 300 | 5 | 86 | 86 |
| 3 | THF | 1:50:100 | 490 | 5 | 98 | 98 |

$^a$Determined through the ratio of integrals of polymer olefin resonance and monomer olefin resonance in $^1$H NMR spectrum, and
$^b$Degree of polymerization.

The results of the cyclic polysulfane-polynorbornene block copolymer synthesis are outlined in Tables 1 and 2. The ROMP of the polynorbornene (pChNDI) block was complete within 20 minutes, but the conversion of the sulfur-rich cyclic polysulfane-based polymer was influenced significantly by the relative degree of polymerization of the soluble norbornene-based monomer and solvent, and the use of a tetrahydrofuran (THF) solvent and high CPM concentration gave the best results. Using the optimized conditions, cyclic polysulfane-polynorbornene block copolymers with soluble norbornene-based monomer/CPM ratios of up to 50:100 were obtained.

Example 4

Preparation of Block Copolymer Thin Films for SEM and Ellipsometry

Block copolymer nanoparticles for SEM imaging were prepared by drop-casting a 0.05 mg/mL solution of polymer in chloroform onto a piranha-cleaned silicon wafer. Polymer thin films (thickness ~150 nm) for ellipsometry were prepared by spin-casting a 20 mg/mL solution of polymer in chloroform onto a piranha-cleaned silicon wafer at 400 rpm for 30 seconds followed by drying under vacuum overnight. The refractive index of a pChNDI homopolymer film prepared in this manner was identical to the value reported in the literature.

Example 5

Refractive index of Cyclic Polysulfane-polynorbornene Block Copolymer

The synthesized cyclic polysulfane-polynorbornene block copolymer was dissolved in chloroform at a concentration of 20 mg/mL and then spin-coated on a silicon substrate at 3000 rpm for 30 seconds. A refractive index of the polymer film sample prepared as such was measured using spectral ellipsometry at a wavelength of 632.8 nm and 830.0 nm. It was confirmed that a block copolymer including the CPM was increased in refractive index by 0.05 or more as compared with the existing homopolymer including the soluble norbornene-based monomer. Particularly, an improvement in refractive index was also observed even at a wavelength of 830.0 nm included in the range of near infrared light.

Example 6

Thermal Stability of Cyclic Polysulfane-polynorbornene Block Copolymer

Figure 7:
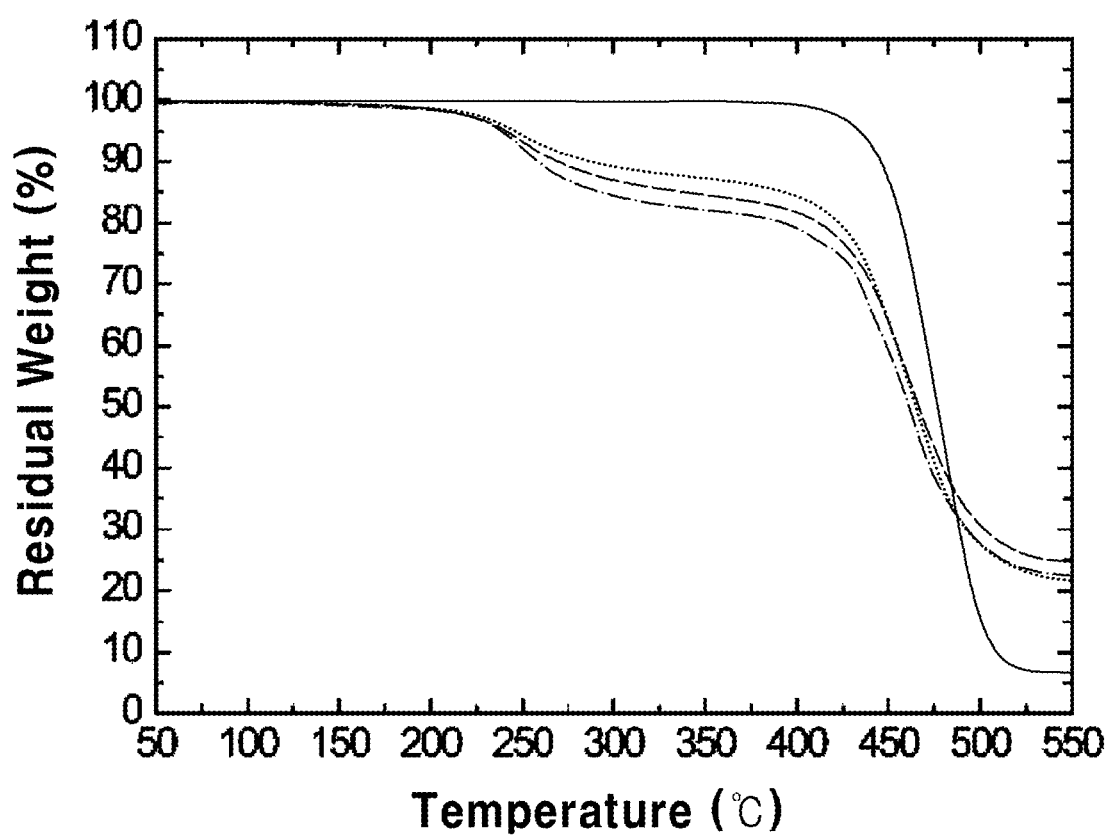
FIG. 7 is a graph showing thermogravimetric analysis traces of a pChNDI copolymer (black) and pChNDI$_{100}$-b-pCPM$_m$ BCP[with m=30 (red), m=40 (green), and m=60 (blue)] in accordance with an example of the present disclosure.

The synthesized polysulfane-polynorbornene block copolymer was dried under vacuum at room temperature for 6 hours or more, and then, thermal stability thereof was evaluated through thermogravimetric analysis (TGA) (Measurement temperature range: from 30° C. to 550° C., Heating rate: 10° C. per minute). As shown in FIG. 7, it was observed that the conventional homopolymer including only the soluble norbornene-based monomer started thermal degradation at 430° C., whereas the block copolymer including the CMP prepared according to the present disclosure underwent a primary weight reduction caused by thermal degradation of the sulfur-containing block at 220° C. and a secondary weight reduction caused by thermal degradation of the soluble block at 430° C. It was observed that the width of decrease in the primary weight reduction increased depending on the length of the sulfur-containing block.

Example 7

Figure 8A:
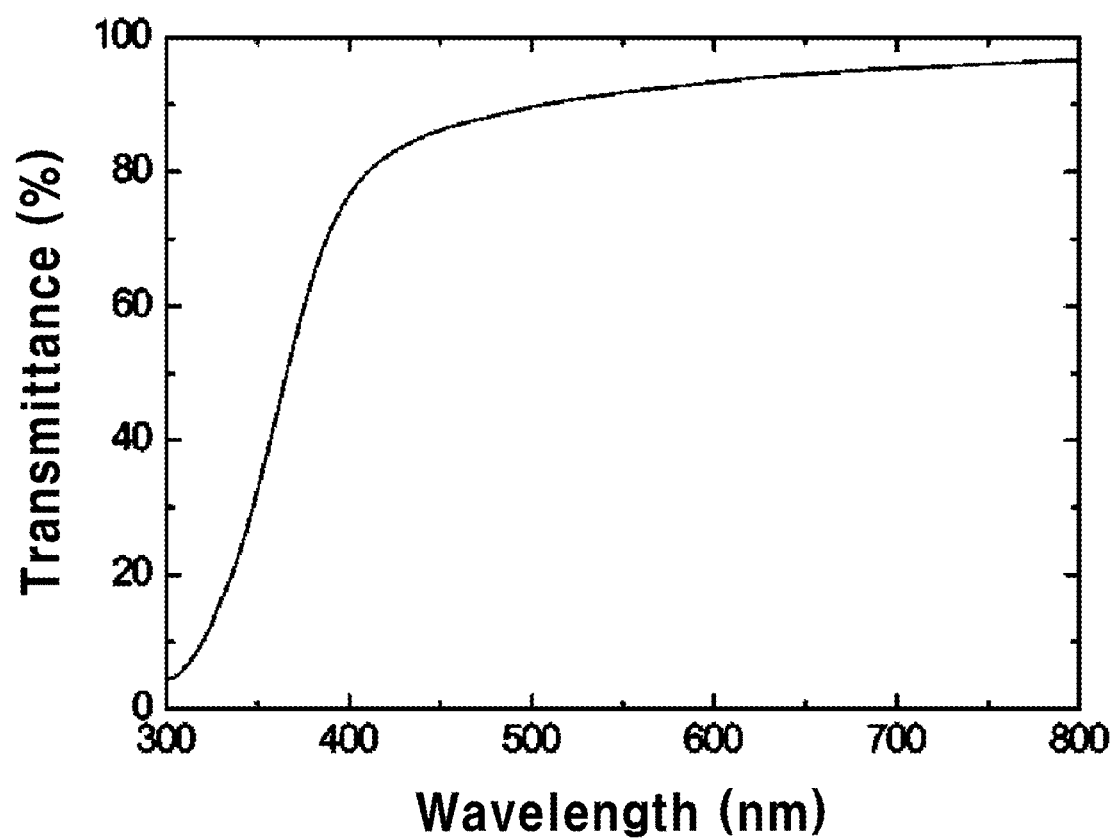
FIG. 8A is a graph of transmittance versus wavelength of a pChNDI100-b-pCPM40 film prepared by drop-casting on a microscope slide in accordance with an example of the present disclosure.
Figure 8B:
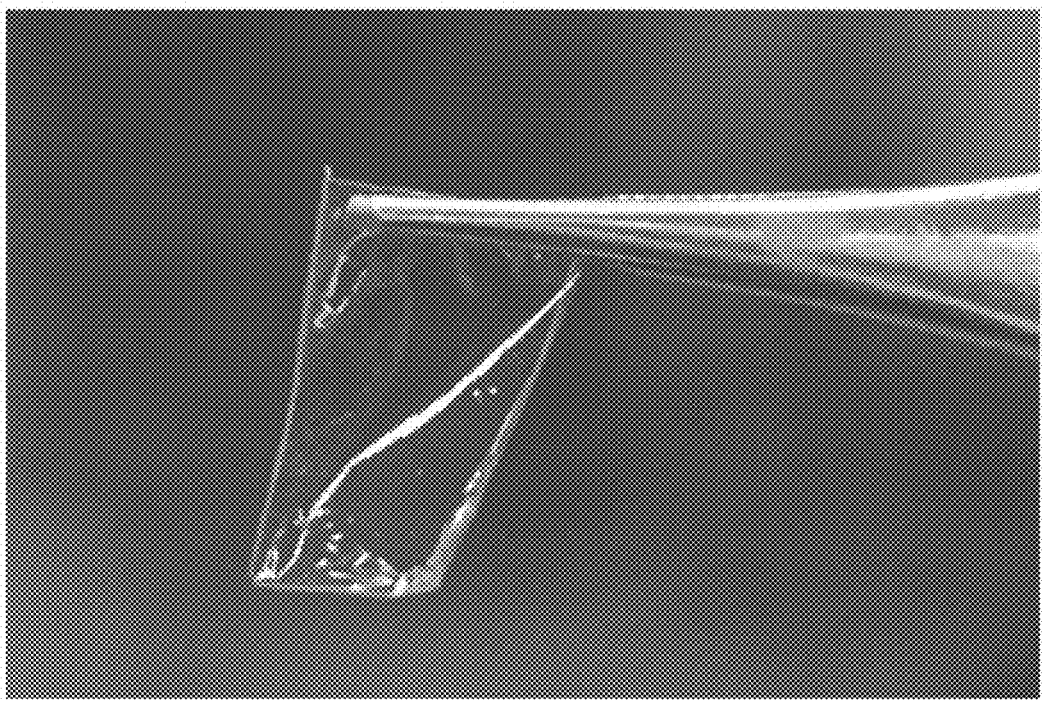
FIG. 8B is a photo of a drop-casting film after being peeled off from a substrate in accordance with an example of the present disclosure.

Preparation of Self-Supporting Film of Cyclic Polysulfane-polynorbornene Block Copolymer and Measurement of Transmittance for Each Wavelength Range The synthesized cyclic polysulfane-polynorbornene block copolymer in chloroform at a concentration of 50 mg/mL was drop-cast onto a glass substrate. A cyclic polysulfane-polynorbornene block copolymer film prepared by the drop-casting method was obtained as a self-supporting film, and the result of measurement of a film thickness using an alpha step profilometer shows that the film was formed to a uniform thickness of about 10 micrometers (FIG. 8B). According to the result of measurement of transmittance of the cyclic polysulfane-polynorbornene block copolymer film, a transmittance of 80% or more was observed in a visible light range of from 400 nm to 800 nm (FIG. 8A).

Result and Analysis

Figure 2A:
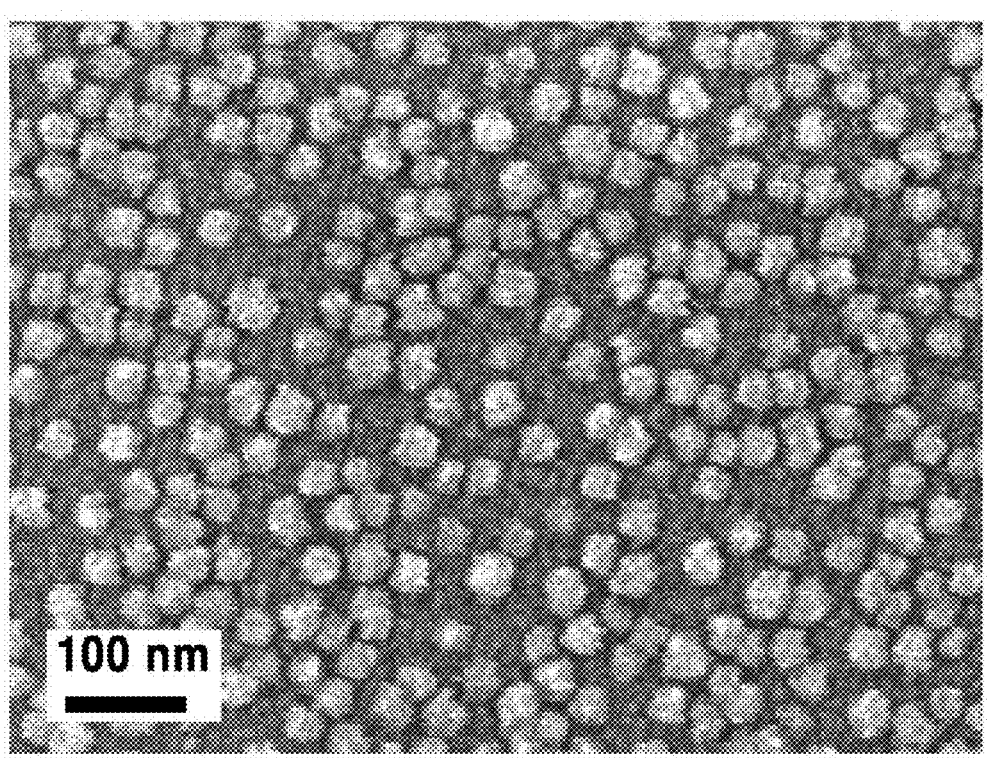
FIG. 2A and FIG. 2B show a SEM image (FIG. 2A) and a XPS spectrum (FIG. 2B) of synthesized cyclic polysulfane-polynorbornene block copolymer in accordance with an example of the present disclosure.
Figure 2B:
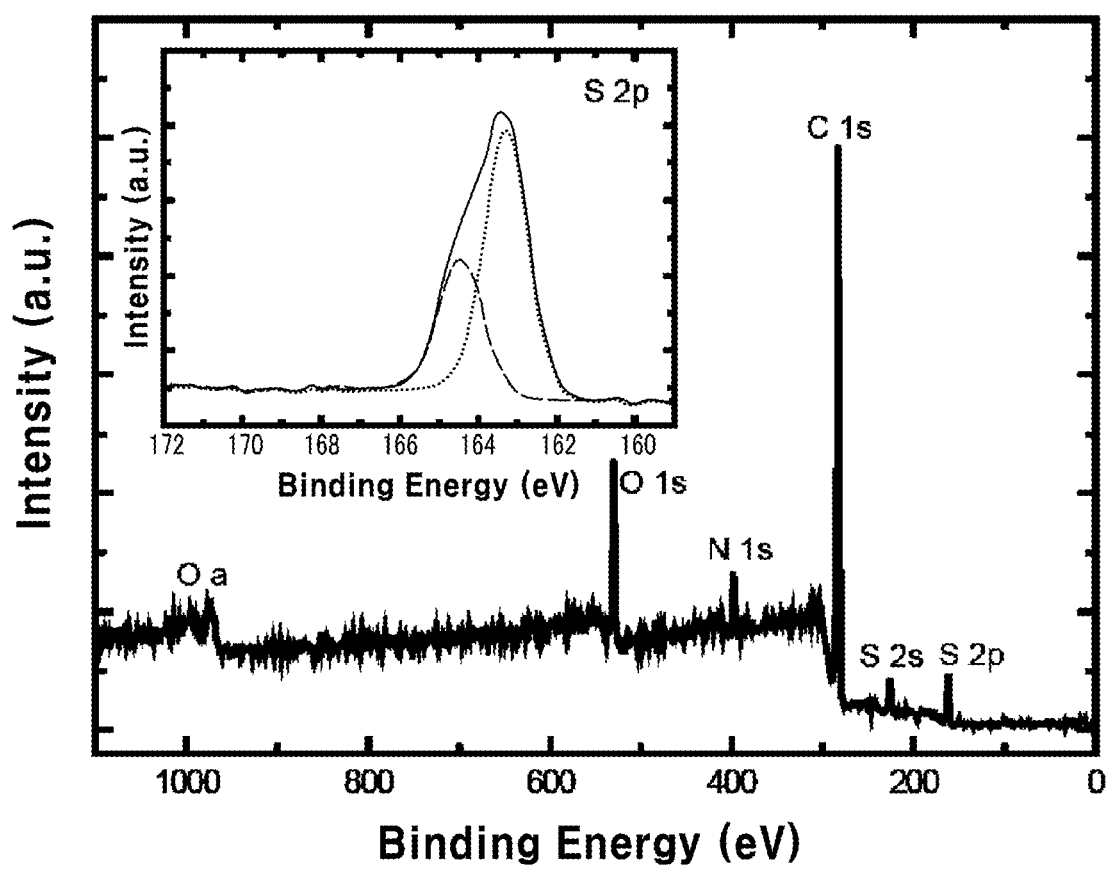
Figure 3A:
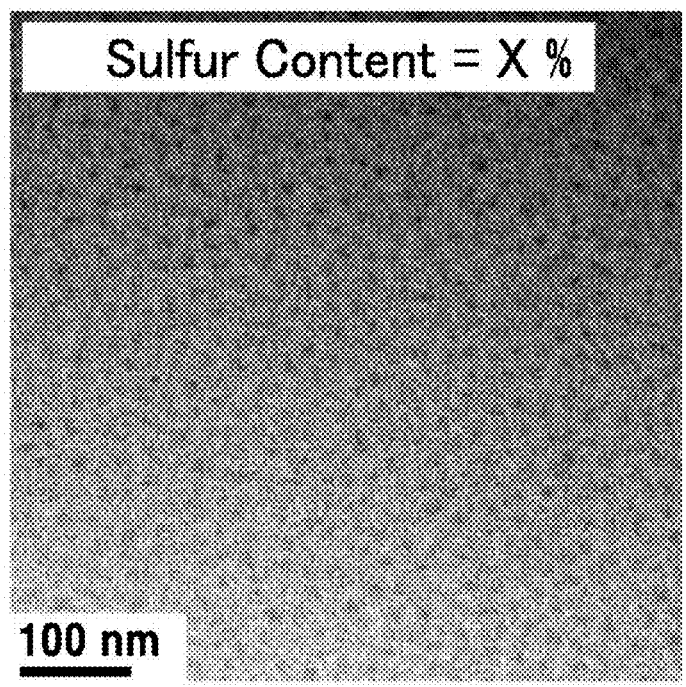
FIG. 3A to FIG. 3D show TEM images (FIG. 3A to FIG. 3C) and a graph of DLS analysis (FIG. 3D) of synthesized cyclic polysulfane-polynorbornene block copolymer in accordance with an example of the present disclosure.
Figure 3B:
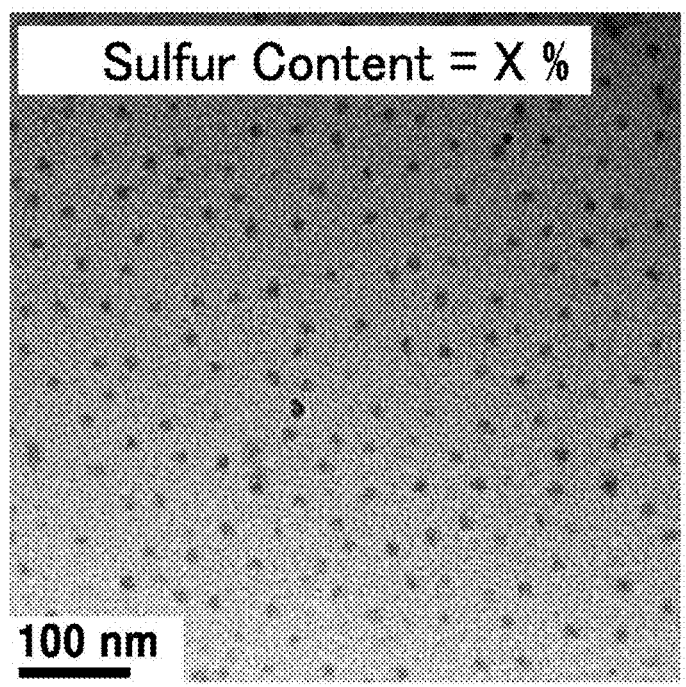
Figure 3C:
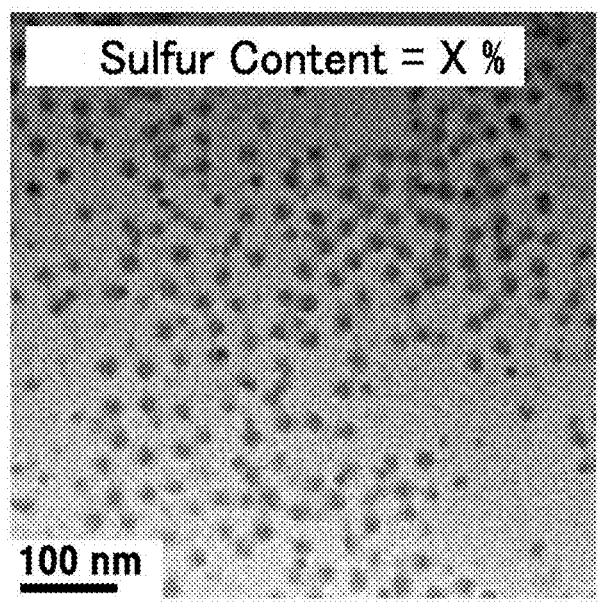
Figure 3D:
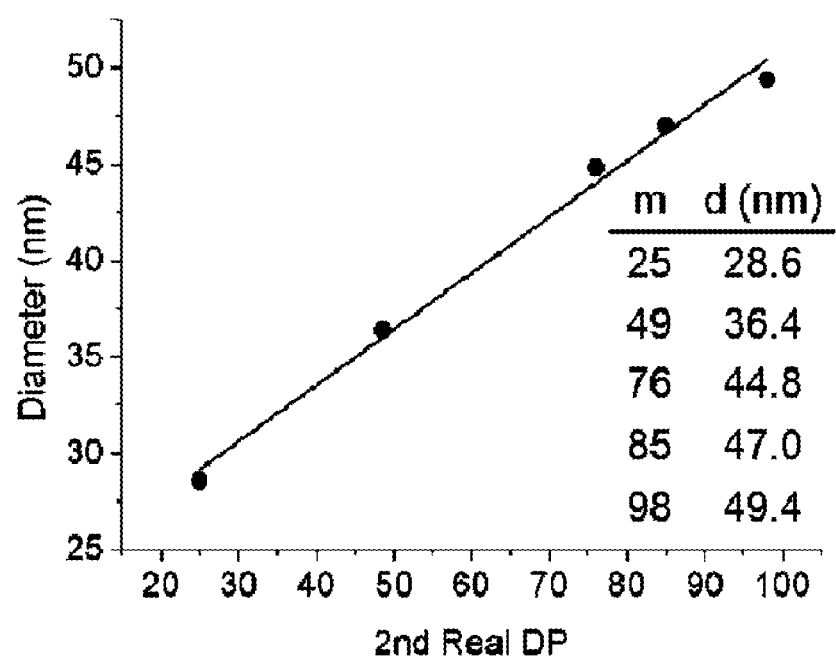

The $^1$H NMR spectra (FIG. 1) of the obtained polymers showed only the resonances corresponding to the pChNDI block, despite the fact that the polymers appeared soluble in various organic solvents. This was indicative of nanoparticle formation, since NMR resonances from the core blocks of cyclic polysulfane-polynorbornene block copolymer micelles are generally not seen due to low mobility. Scanning electron microscopy (SEM) of pChNDI$_{50}$-b-pCPM$_{100}$, drop-cast from a dilute chloroform solution, confirmed nanoparticle formation and revealed even size distribution of 35.8±3.5 nm, as determined through SEM image analysis (FIG. 2). X-ray photoelectron spectroscopy on the pChNDI$_{50}$-b-pCPM$_{100}$ film spun-cast from concentrated solutions showed the S$_{2p}$ region analogous to that of the XPS spectrum of elemental sulfur, consistent with the chemical structure of CPM. The analyses indicated that the CPM-containing block copolymers formed nanoparticle structures in situ in a mild, one-pot reaction carried out at room temperature.

Figure 4:
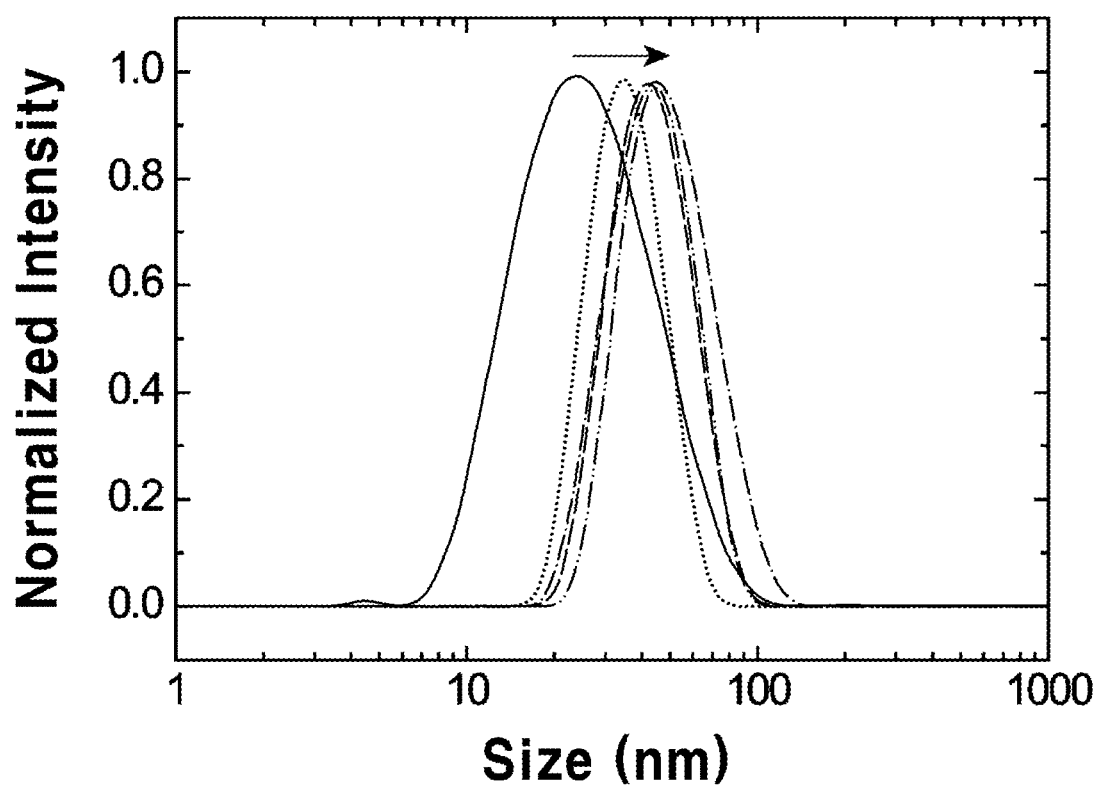
FIG. 4 is a graph showing DLS traces of synthesized cyclic polysulfane-polynorbornene block copolymer in accordance with an example of the present disclosure.
Figure 5A:
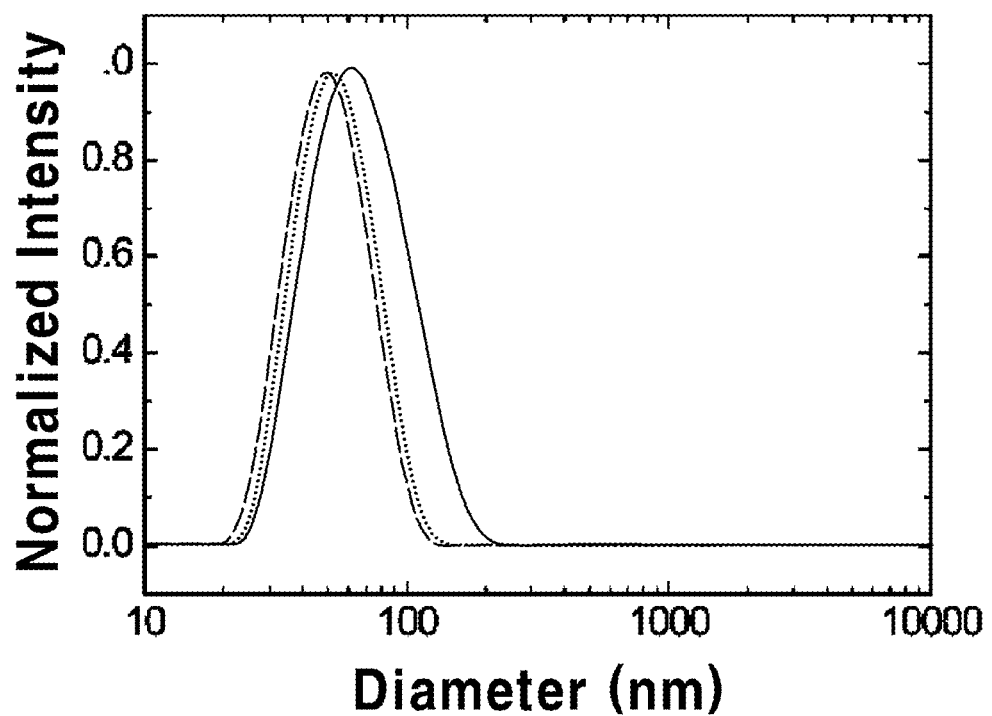
FIG. 5A to FIG. 5D show a DLS analysis of synthesized cyclic polysulfane-polynorbornene block copolymer (FIG. 5A and FIG. 5B) and a TEM image (FIG. 5C) and an AFM image (FIG. 5D) of the synthesized cyclic polysulfane-polynorbornene block copolymer in accordance with an example of the present disclosure.
Figure 5B:
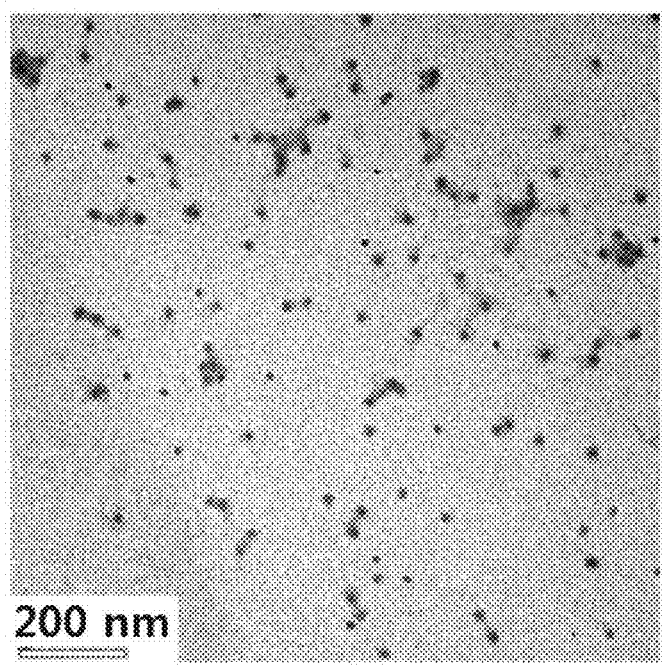
Figure 5C:
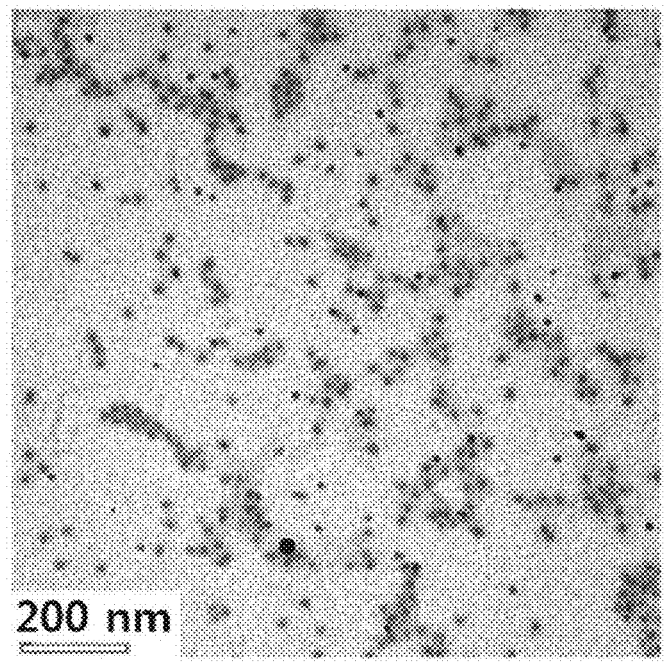
Figure 5D:
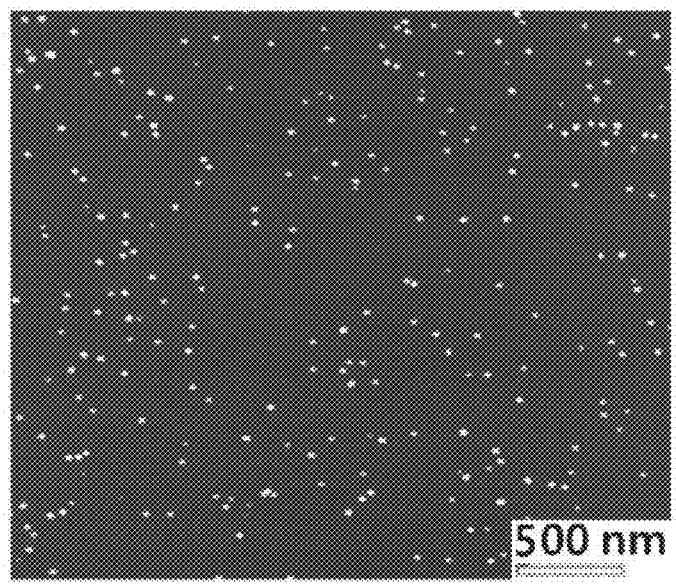

To investigate the effect of the degree of polymerization of the CPM block on size and morphology, cyclic polysulfane-polynorbornene block copolymers (pChNDI$_{50}$-pCPM$_m$), with the CPM content ranging from 25 to 100, were prepared and characterized (FIG. 3). It was found that the increase in m of the nanoparticle-sized CPM led to the increase in the nanoparticle size, as determined from DLS in chloroform, in a near-linear fashion from 28.6 nm to 51.6 nm (FIG. 4). The nanoparticles could be imaged through TEM without the aid of staining agents, presumably due to the high contrast provided by the electron-rich sulfur atoms. The size of the nanoparticles, measured from TEM images, with m=49 was 11.4±0.9 nm and with m=98 was 20.9±1.7 nm. The near two-fold increase in the size seen through TEM despite a 1.5-fold increase in the total degree of polymerization and hydrodynamic diameter was attributed to the low contrast of sulfur-free polynorbornene-based monomer compared to that of the cyclic polysulfane-based polymer core block. Interestingly, even at relatively high ChNDI/CPM ratio of 50:98, no immediate structural alterations were observed. The DLS analyses of the CPM solutions showed no significant dependence on concentration, with the hydrodynamic diameter and polydispersity remaining unaltered as the concentration was varied between 1 mg/ml to 10 mg/ml. Furthermore, no changes in the hydrodynamic diameter nor distribution was observed after 24 hours in solution, suggesting that the nanoparticles were stable even for the case in which the degree of polymerization of the soluble block is relatively low.

These observations are in contrast to the PISA of block copolymers in water where relatively short soluble blocks resulted in secondary nanostructures, an observation attributed to the poor steric stabilization provided by the short outer blocks inducing micelle fusion through inelastic collisions. Moreover, in situ nanoparticlization of conjugated polymers with a high degree of polymerization of the insoluble block gave rise to higher supramolecular structures such as nanocaterpillars and nanostar networks from the self-assembly of individual polymer nanoparticles. The observation with the CPM block copolymers suggests that the system maintains well-defined nanoparticle morphology even at high sulfur contents. The absence of higher supramolecular structures in the block copolymers prepared under these conditions is particularly important for applications in optical films, since the presence of large (>100 nm) structures causes scattering of light in the visible range (i.e. Mie scattering).

It has been reported that small molecules bearing tetrasulfane moieties degrade rapidly at 80° C. through homolytic cleavage and redistribution of the labile S—S bonds. In order for pCPM block copolymer nanoparticles to be applicable in the refractive index enhancement of transparent polymer films, their stability in the temperature ranges typically used in polymer processing is highly important. When a sample of pChNDI$_{50}$-b-pCPM$_{98}$ nanoparticles, with a hydrodynamic diameter of 59.6 nm (PDI=0.157) in chlorobenzene, was heated to 80° C. for 5 hours, particle size distribution remained virtually unchanged (PDI=0.137), although a slight decrease in size to 50.0 nm was observed through DLS analysis (FIG. 5). Further heating the sample at 80° C. for 24 hours gave particles with average hydrodynamic diameter of 46.3 nm with a PDI of 0.138. Spherical morphology of the particles was maintained as seen through TEM images. While it is presumed that the S—S bond within the nanoparticles are dissociating and reforming within the core of the nanoparticles, leading to core cross-linking, further investigations are currently under way to elucidate the observed thermal behavior.

Figure 6A:
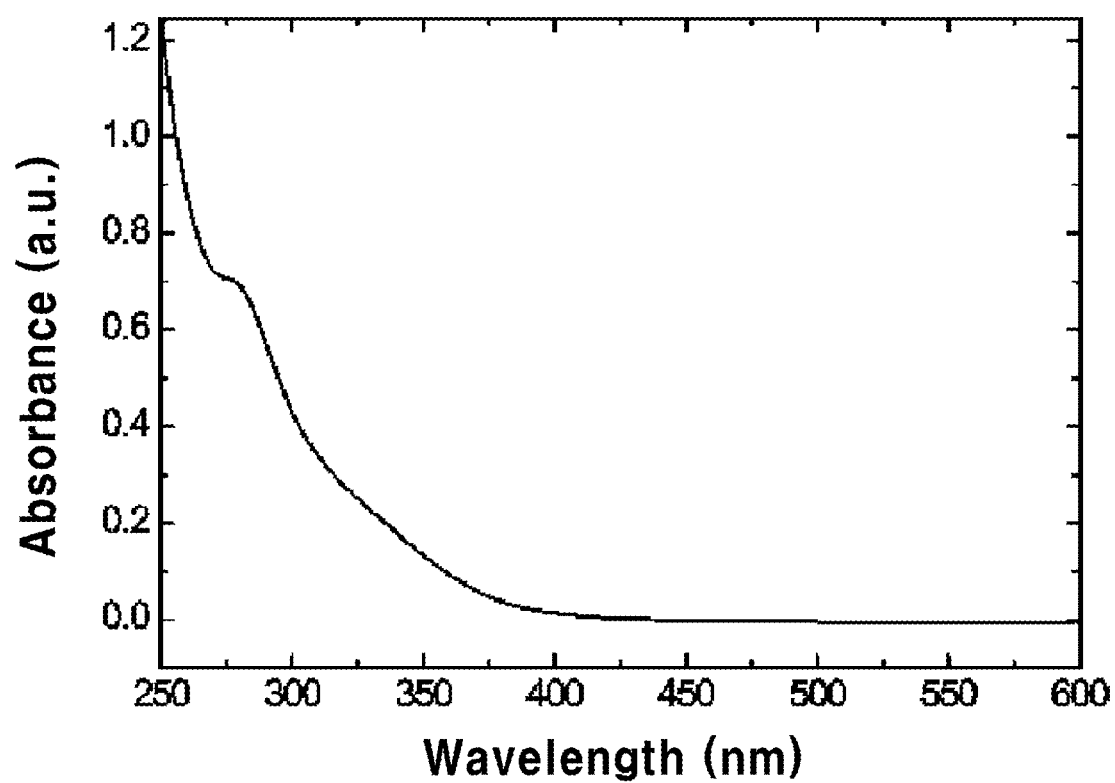
FIG. 6A and FIG. 6B show a UV-Vis absorption spectrum of synthesized cyclic polysulfane-polynorbornene block copolymer (FIG. 6A) and refractive indexes of cyclic polysulfane-polynorbornene block copolymers synthesized using various sulfur contents (FIG. 6B) in accordance with an example of the present disclosure.
Figure 6B:
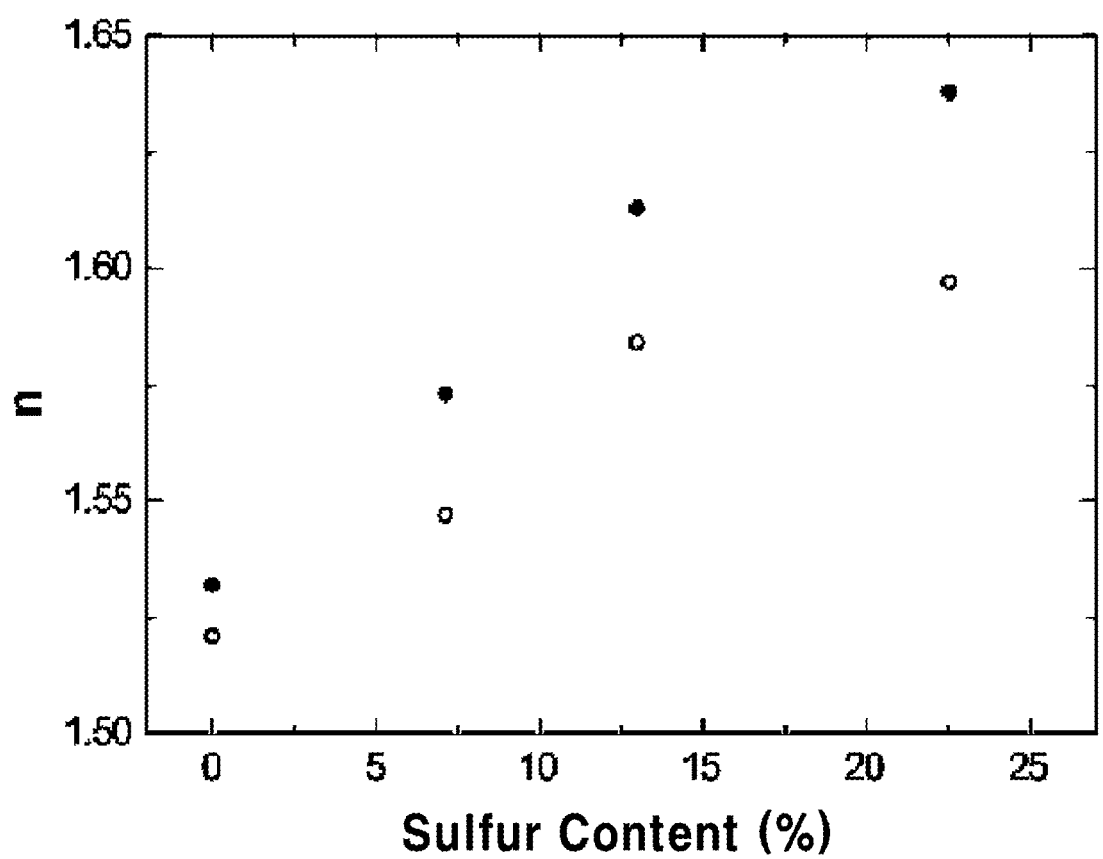

The UV-Vis absorption spectra of the polymer nanoparticles showed relatively strong absorption in the UV region, but were nearly transparent in the visible range (FIG. 6A). Encouraged by the transparency of the polymers in solution, optical properties of polymer thin films were investigated. It has previously been reported that the presence of condensed, sulfur-containing alicycles enhance the refractive indices of polymeric materials, with the degree of enhancement depending on overall sulfur content. The refractive indices, determined using ellipsometry, of cyclic polysulfane-polynorbornene block copolymers with various sulfur contents are shown in FIG. 6B. Thin films of pChNDI$_{100}$-b-pCPM$_m$ exhibited refractive index enhancement which increased with increasing sulfur content. The results indicate that the cyclic polysulfane-polynorbornene block copolymer allows for a fine control over refractive index through simply varying the feed ratio of the monomers during the one-pot copolymerization. This is advantageous over previous methods which require changes in monomer design and polymer synthesis in order to vary sulfur content and the resulting refractive index.

In summary, cyclic polysulfane-polynorbornene block copolymers were prepared through a living polymerization of monomers containing cyclic polysulfane moieties. The lack of solubility of the polysulfane-containing block was solved by using a soluble first block, and the resulting cyclic polysulfane-polynorbornene block copolymers were obtained as nanoparticles in a one-pot polymerization. The sulfur content, and, more notably, the refractive indices of the cyclic polysulfane polynorbornene block copolymer-nano particles could be readily controlled by varying the relative feed ratio of the sulfur-rich monomer. The results not only demonstrate the applicability of a mild ROMP in preparing well-defined polymers from highly delicate monomers and the potential of sulfur-rich polymers for in situ preparation of block copolymernanoparticles but also present a polymeric system in which the refractive index can be precisely controlled in a modular fashion without the need of novel synthetic design.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A cyclic polysulfane-based polymer, which is obtained by polymerization of a sulfur-containing cyclic olefin monomer represented by any one of the following Chemical Formulas 1-1 to 1-3:

[Chemical Formula 1-1]

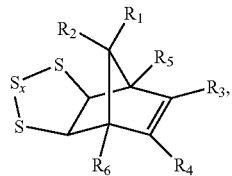

[Chemical Formula 1-2]

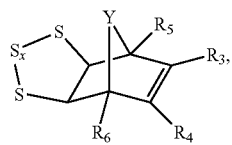

[Chemical Formula 1-3]

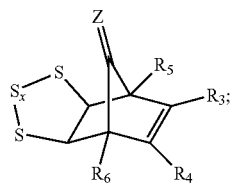

wherein, in Chemical Formulas 1-1 to 1-3, x may be from 1 to 5;

each of $R_1$, $R_2$, $R_5$ and $R_6$ may be independently H, an alkyl group, a halogen, —OR wherein R is a C1 to C25 linear or branched alkyl group or an isomer thereof, or —COOR' wherein R' is a C1 to C25 linear or branched alkyl group or an isomer thereof;

each of $R_3$ and $R_4$ may be independently H or an alkyl group;

Y may be NH, O, or S; and

Z may be O or S.

2. The cyclic polysulfane-based polymer of claim 1, wherein the cyclic polysulfane-based polymer includes one represented by any one of the following Chemical Formulas 2-1 to 2-3:

[Chemical Formula 2-1]

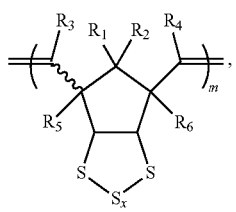

[Chemical Formula 2-2]

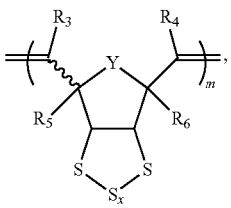

[Chemical Formula 2-3]

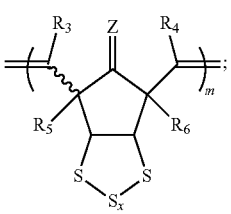

wherein, in Chemical Formulas 2-1 to 2-3, m is from 1 to 1000;

x is 1 to 5;

each of $R_1$, $R_2$, $R_5$, and $R_6$ may be independently H, an alkyl group, a halogen, —OR wherein R is a C1 to C25 linear or branched alkyl group or an isomer thereof, or —COOR' wherein R' is a C1 to C25 linear or branched alkyl group or an isomer thereof;

each of $R_3$ and $R_4$ may be independently H or an alkyl group;

Y may be NH, O, or S; and

Z may be O or S.

3. A cyclic polysulfane-polynorbornene block copolymer, which is obtained by copolymerizing a sulfur-containing cyclic olefin monomer represented by any one of Chemical Formulas 1-1 to 1-3 defined in claim 1 with a norbornene-based monomer represented by any one of the following Chemical Formulas 3-1 to 3-6:

[Chemical Formula 3-1]

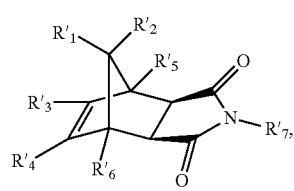

[Chemical Formula 3-2]

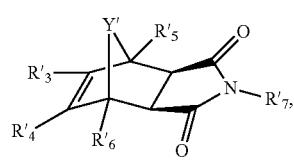

[Chemical Formula 3-3]

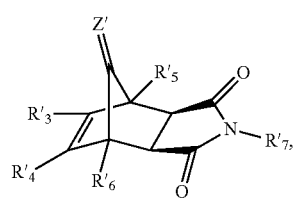

[Chemical Formula 3-4]

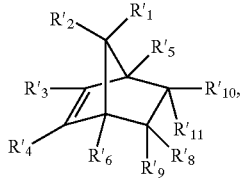

[Chemical Formula 3-5]

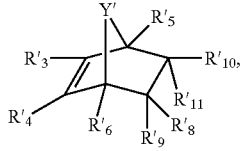

[Chemical Formula 3-6]

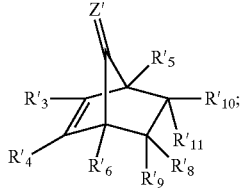

wherein, in Chemical Formulas 3-1 to 3-6, each of $R'_1$, $R'_2$, $R'_5$, and $R'_6$ may independently be H, an alkyl group, a halogen, —OR wherein R is a C1 to C25 linear or branched alkyl group or an isomer thereof, or —COOR' wherein R' is a C1 to C25 linear or branched alkyl group or an isomer thereof;

each of $R'_3$ and $R'_4$ may be independently H or an alkyl group;

$R'_7$ may be an alkyl group or a cycloalkyl group;

Y' may be NH, O, or S;

Z' may be O or S; and each of $R'_8$, $R'_9$, $R'_{10}$, and $R'_{11}$ may be independently H, an alkyl group, a halogen, —OR wherein R is a C1 to C25 linear or branched alkyl group or an isomer thereof or —COOR' wherein R' is a C1 to C25 linear or branched alkyl group or an isomer thereof.

4. The cyclic polysulfane-polynorbornene block copolymer according to claim 3, wherein the cyclic polysulfane-polynorbornene block copolymer includes one represented by any one of the following Chemical Formulas 4-1 to 4-18:

[Chemical Formula 4-1]

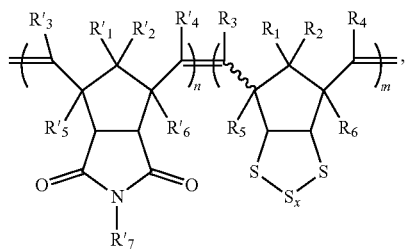

[Chemical Formula 4-2]

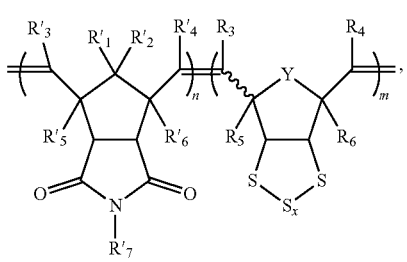

[Chemical Formula 4-3]

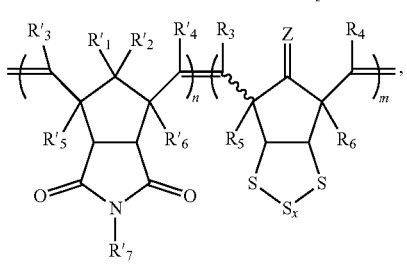

[Chemical Formula 4-4]

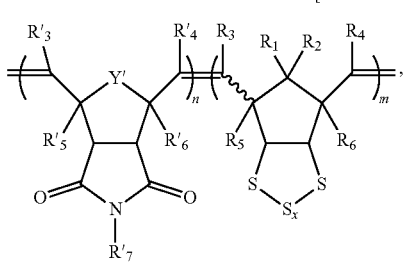

[Chemical Formula 4-5]

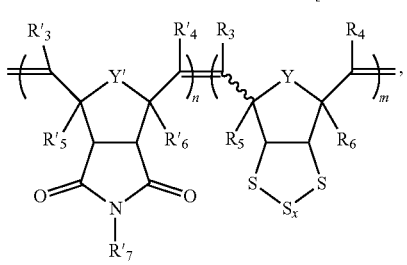

[Chemical Formula 4-6]

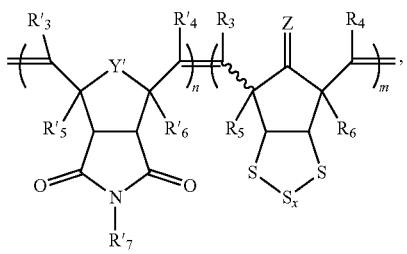

[Chemical Formula 4-7]

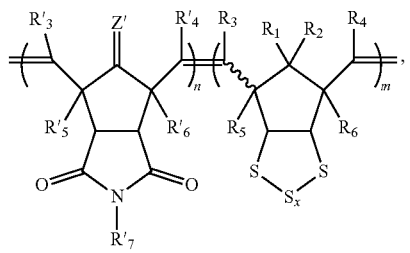

[Chemical Formula 4-8]

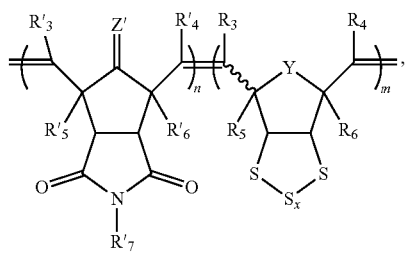

[Chemical Formula 4-9]

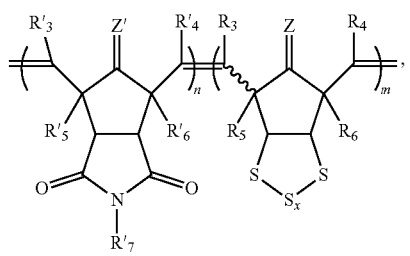

[Chemical Formula 4-10]

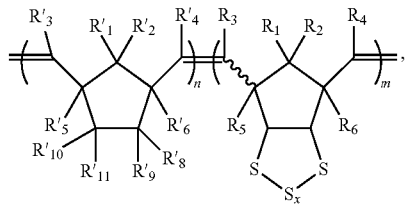

[Chemical Formula 4-11]

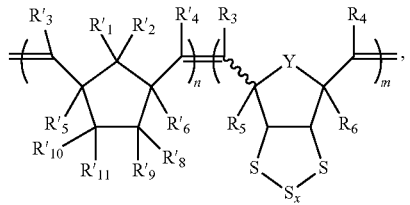

[Chemical Formula 4-12]

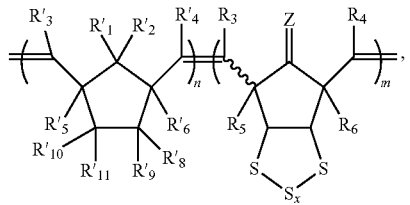

[Chemical Formula 4-13]

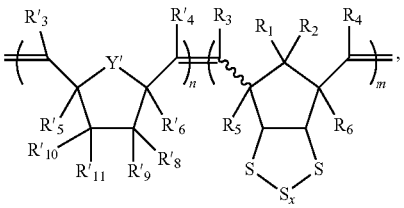

[Chemical Formula 4-14]

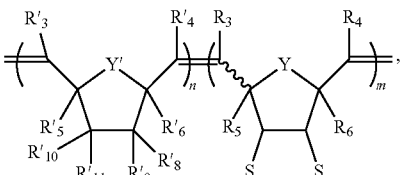

[Chemical Formula 4-15]

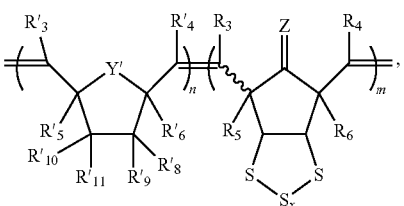

[Chemical Formula 4-16]

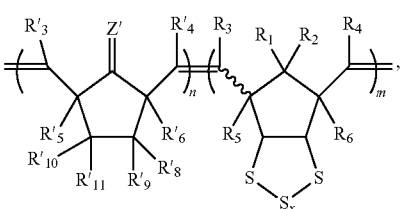

[Chemical Formula 4-17]

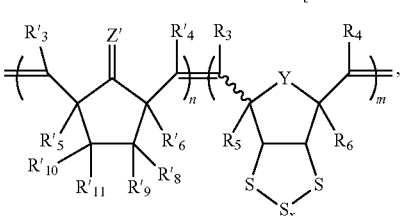

[Chemical Formula 4-18]

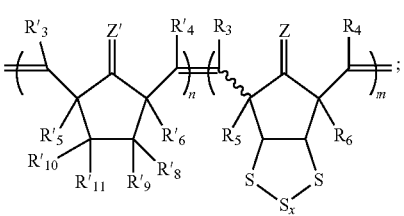

wherein,
in Chemical Formulas 4-1 to 4-18,
each of n and m is 1 to 1000;
x is 1 to 5;
each of $R_1$, $R_2$, $R_5$, and $R_6$ may be independently H, an alkyl group, a halogen, —OR wherein R is a C1 to C25 linear or branched alkyl group or an isomer thereof, or —COOR' wherein R' is a C1 to C25 linear or branched alkyl group or an isomer thereof;

each of $R_3$ and $R_4$ may be independently H or an alkyl group;

each of $R'_1$, $R'_2$, $R'_5$, and $R'_6$ may be independently H, an alkyl group, a halogen, —OR wherein R is a C1 to C25 linear or branched alkyl group or an isomer thereof, or —COOR' wherein R' is a C1 to C25 linear or branched alkyl group or an isomer thereof;

each of $R'_3$ and $R'_4$ may be independently H or an alkyl group;

$R'_7$ may be an alkyl group or a cycloalkyl group, each of $R'_8$, $R'_9$, $R'_{10}$, and $R'_{11}$ may be independently H, an alkyl group, a halogen, —OR wherein R is a C1 to C25 linear or branched alkyl group or an isomer thereof, or —COOR' wherein R' is a C1 to C25 linear or branched alkyl group or an isomer thereof;

Y and Y' may be NH, O, or S; and

Z and Z' may be O or S.

5. The cyclic polysulfane-polynorbornene block copolymer according to claim 3,
wherein a ratio of the cyclic polysulfane block to the polynorbornene block in the cyclic polysulfane-polynorbornene block copolymer is in the range of 1:0.001 to 1000.

6. The cyclic polysulfane-polynorbornene block copolymer according to claim 3,
wherein the cyclic polysulfane-polynorbornene block copolymer has solubility in an organic solvent.

7. The cyclic polysulfane-polynorbornene block copolymer according to claim 3,
wherein the cyclic polysulfane-polynorbornene block copolymer has a nanoparticular form.

8. The cyclic polysulfane-polynorbornene block copolymer according to claim 7,
wherein the nanoparticle of the cyclic polysulfane-polynorbornene block copolymer exhibits thermal stability.

9. The cyclic polysulfane-polynorbornene block copolymer according to claim 7,
wherein the cyclic polysulfane-polynorbornene block copolymer includes the nanoparticle in a micelle form in which the polynorbornene block forms a shell on a core containing the cyclic polysulfane.

10. The cyclic polysulfane-polynorbornene block copolymer according to claim 3,
wherein the cyclic polysulfane-polynorbornene block copolymer has transmittance to visible light or light having a wavelength of from 400 nm to 1200 nm.

11. A film, comprising the cyclic polysulfane-polynorbornene block copolymer according to claim 3.

12. The film according to claim 11,
wherein the film comprising the cyclic polysulfane-polynorbornene block copolymer has an improved refractive index as compared to a polynorbornene polymer.

13. The film according to claim 12,
wherein a refractive index of the film comprising the cyclic polysulfane-polynorbornene block copolymer exhibits a refractive index increase of 0.02 or more in a range of visible light and/or near infrared light as compared with a polynorbornene polymer.

14. A method of preparing the cyclic polysulfane-based polymer according to claim 1, comprising:
one-pot polymerizing a sulfur-containing cyclic olefin monomer represented by any one of Chemical Formulas 1-1 to 1-3 defined in claim 1 in the presence of a phosphine-free third generation Grubbs catalyst to obtain the cyclic polysulfane-based polymer.

15. The method of claim 14,
wherein the catalyst is represented by the following Chemical Formula 5-1 or 5-2:

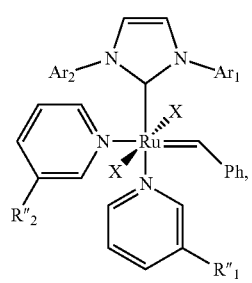

[Chemical Formula 5-1]

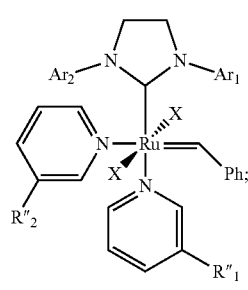

[Chemical Formula 5-2]

wherein,
in Chemical Formulas 5-1 and 5-2,
X may be halogen;
each of $R''_1$ and $R''_2$ may be independently H, an alkyl group, a halogen, —OR wherein R is a C1 to C25 linear or branched alkyl group or an isomer thereof, or —COOR' wherein R' is a C1 to C25 linear or branched alkyl group or an isomer thereof; and
each of $Ar_1$ and $Ar_2$ may be independently phenyl group which may be substituted by a linear or branched alkyl group.

16. A method of preparing the cyclic polysulfane-polynorbornene block copolymer according to claim 3, comprising:
polymerizing a soluble norbornene-based monomer represented by any one of Chemical Formulas 3-1 to 3-6 defined in claim 3 in the presence of a phosphine-free third-generation Grubbs catalyst; and
followed by copolymerization with a sulfur-containing cyclic olefin monomer represented by any one of the Chemical Formulas 1-1 to 1-3 to form a cyclic polysulfane-polynorbornene block copolymer.

17. The method of claim 16,
wherein the catalyst is represented by the following Chemical Formula 5-1 or 5-2:

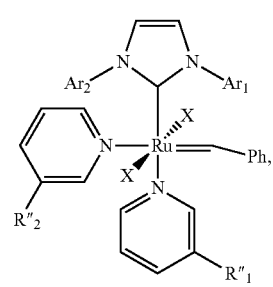

[Chemical Formula 5-1]

[Chemical Formula 5-2]

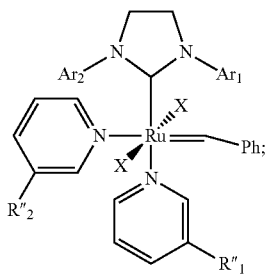

wherein,
in Chemical Formulas 5-1 and 5-2,
X may be halogen;
each of $R''_1$ and $R''_2$ may be independently H, an alkyl group, a halogen, —OR wherein R is a C1 to C25 linear or branched alkyl group or an isomer thereof, or —COOR' wherein R' is a C1 to C25 linear or branched alkyl group or an isomer thereof; and
each of $Ar_1$ and $Ar_2$ may be independently phenyl group which may be substituted by a linear or branched alkyl group.

* * * * *